US011502798B1

(12) United States Patent
Horn et al.

(10) Patent No.: US 11,502,798 B1
(45) Date of Patent: Nov. 15, 2022

(54) SEPARATED TONE RESERVATION NULL INDICATIONS FOR TONE RESERVATION

(71) Applicant: QUALCOMM Incorporated, San Diego, CA (US)

(72) Inventors: Idan Michael Horn, Hod Hasharon (IL); Shay Landis, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/242,099

(22) Filed: Apr. 27, 2021

(51) Int. Cl.

| | |
|---|---|
| ***H04L 27/26*** | (2006.01) |
| ***H04L 5/00*** | (2006.01) |
| ***H04B 17/336*** | (2015.01) |
| ***H04W 72/04*** | (2009.01) |

(52) U.S. Cl.
CPC ......... *H04L 5/0048* (2013.01); *H04B 17/336* (2015.01); *H04W 72/042* (2013.01); *H04W 72/0453* (2013.01)

(58) Field of Classification Search
CPC . H04B 17/336; H04L 27/2614; H04L 27/262; H04L 27/2618; H04W 24/10
USPC ........................................................ 370/329
See application file for complete search history.

(56) References Cited

U.S. PATENT DOCUMENTS

2007/0071120 A1* 3/2007 Talwar ................ H04L 27/2614 375/260
2007/0242598 A1* 10/2007 Kowalski ............ H04L 27/2618 370/206
2010/0067615 A1* 3/2010 Dorpinghaus ...... H04L 27/2618 375/295
2021/0359890 A1* 11/2021 Sahraei ............... H04L 27/2614
2021/0377813 A1* 12/2021 Landis ............. H04W 72/0453
2022/0070039 A1* 3/2022 Ly ....................... H04L 27/2618
2022/0095306 A1* 3/2022 Ly ..................... H04W 72/0473
2022/0167269 A1* 5/2022 Horn .................. H04W 52/143

* cited by examiner

*Primary Examiner* — Robert J Lopata
(74) *Attorney, Agent, or Firm* — ArentFox Schiff LLP

(57) ABSTRACT

Example aspects include a method, apparatus, and computer-readable medium for wireless communication at a base station of a wireless communication network, comprising obtaining a downlink channel response of a downlink channel. The aspects further include determining to perform tone reservation with separated tone reservation null indications on a downlink transmission from the base station to a user equipment (UE). Additionally, the aspects include selecting a plurality of channel nulls of the downlink transmission. Additionally, the aspects include assigning a tone reservation quantity to each channel null of the plurality of channel nulls resulting in a plurality of tone reservation quantities. Additionally, the aspects include sending, to the UE via the downlink channel, a tone reservation report. Additionally, the aspects include sending, to the UE via the downlink channel, the downlink transmission according to the plurality of channel nulls and the plurality of tone reservation quantities.

30 Claims, 12 Drawing Sheets

SEPARATED TONE RESERVATION NULL INDICATIONS FOR TONE RESERVATION

BACKGROUND

Technical Field

The described aspects relate generally to wireless communication systems, and more particularly, to techniques for providing tone reservation with separated tone reservation null indications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communications may include performing tone reservation procedures to reduce a peak-to-average-power ratio (PAPR) of transmissions, and, as such, to potentially reduce power consumption. However, under certain channel conditions, the tone reservation procedures may encounter estimation errors that may cause descrambling errors, which may delay and/or prevent communications between network devices. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and non-transitory computer-readable mediums for wireless communication are disclosed by the present disclosure.

An example aspect includes a method of wireless communication at a base station of a wireless communication network, comprising obtaining a downlink channel response of a downlink channel between the base station and a user equipment (UE) of the wireless communication network. The method further includes determining, according to the downlink channel response, to perform tone reservation with separated tone reservation null indications on a downlink transmission from the base station to the UE. Additionally, the method further includes selecting, according to the downlink channel response, a plurality of channel nulls of the downlink transmission. Additionally, the method further includes assigning a tone reservation quantity to each channel null of the plurality of channel nulls resulting in a plurality of tone reservation quantities. Additionally, the method further includes sending, to the UE via the downlink channel, a tone reservation report. The tone reservation report comprises an indication of whether the tone reservation with the separated tone reservation null indications is to be performed on the downlink transmission, a count of channel nulls in the plurality of channel nulls, and a plurality of values representing respective tone reservation quantities. Additionally, the method further includes sending, to the UE via the downlink channel, the downlink transmission according to the plurality of channel nulls and the plurality of tone reservation quantities.

Another example aspect includes an apparatus of wireless communication at a base station of a wireless communication network, comprising a memory, and a processor communicatively coupled with the memory. The processor is configured to obtain a downlink channel response of a downlink channel between the base station and a UE of the wireless communication network. The processor is further configured to determine, according to the downlink channel response, to perform tone reservation with separated tone reservation null indications on a downlink transmission from the base station to the UE. Additionally, the processor is further configured to select, according to the downlink channel response, a plurality of channel nulls of the downlink transmission. Additionally, the processor is further configured to assign a tone reservation quantity to each channel null of the plurality of channel nulls resulting in a plurality of tone reservation quantities. Additionally, the processor is further configured to send, to the UE via the downlink channel, a tone reservation report. The tone reservation report comprises an indication of whether the tone reservation with the separated tone reservation null indications is to be performed on the downlink transmission, a count of channel nulls in the plurality of channel nulls, and a plurality of values representing respective tone reservation quantities. Additionally, the processor is further configured to send, to the UE via the downlink channel, the downlink transmission according to the plurality of channel nulls and the plurality of tone reservation quantities.

Another example aspect includes an apparatus of wireless communication at a base station of a wireless communication network, comprising means for obtaining a downlink channel response of a downlink channel between the base station and a UE of the wireless communication network. The apparatus further includes means for determining, according to the downlink channel response, to perform tone reservation with separated tone reservation null indications on a downlink transmission from the base station to the UE. Additionally, the apparatus further includes means for selecting, according to the downlink channel response, a plurality of channel nulls of the downlink transmission. Additionally, the apparatus further includes means for assigning a tone reservation quantity to each channel null of the plurality of channel nulls resulting in a plurality of tone reservation quantities. Additionally, the apparatus further includes means for sending, to the UE via the downlink channel, a tone reservation report. The tone reservation report comprises an indication of whether the tone reservation with the separated tone reservation null indications is to be performed on the downlink transmission, a count of channel nulls in the plurality of channel nulls, and a plurality of values representing respective tone reservation quantities. Additionally, the apparatus further includes means for sending, to the UE via the downlink channel, the downlink transmission according to the plurality of channel nulls and the plurality of tone reservation quantities.

Another example aspect includes a computer-readable medium (e.g., non-transitory computer-readable medium) storing instructions of wireless communication at a UE of a wireless communication network, executable by a processor, to obtain a downlink channel response of a downlink channel between the base station and a UE of the wireless communication network. The computer-readable medium storing further instructions to determine, according to the downlink channel response, to perform tone reservation with separated tone reservation null indications on a downlink transmission from the base station to the UE. Additionally, the computer-readable medium storing further instructions to select, according to the downlink channel response, a plurality of channel nulls of the downlink transmission. Additionally, the computer-readable medium storing further instructions to assign a tone reservation quantity to each channel null of the plurality of channel nulls resulting in a plurality of tone reservation quantities. Additionally, the computer-readable medium storing further instructions to send, to the UE via the downlink channel, a tone reservation report. The tone reservation report comprises an indication of whether the tone reservation with the separated tone reservation null indications is to be performed on the downlink transmission, a count of channel nulls in the plurality of channel nulls, and a plurality of values representing respective tone reservation quantities. Additionally, the computer-readable medium storing further instructions to send, to the UE via the downlink channel, the downlink transmission according to the plurality of channel nulls and the plurality of tone reservation quantities.

Another example aspect includes a method of wireless communication at a UE of a wireless communication network, comprising receiving, from a base station via a downlink channel, a tone reservation report. The tone reservation report comprises an indication of whether tone reservation with separated tone reservation null indications is to be performed on a downlink transmission, a count of channel nulls in the downlink transmission, and a plurality of values representing respective tone reservation quantities of the channel nulls. The method further includes receiving, from the base station via the downlink channel, the downlink transmission. Additionally, the method further includes estimating, according to the tone reservation report, location information of tone reservations in the downlink transmission. Additionally, the method further includes decoding, according to the location information of the tone reservations, the downlink transmission.

Another example aspect includes an apparatus of wireless communication at a UE of a wireless communication network, comprising a memory, and a processor communicatively coupled with the memory. The processor is configured to receive, from a base station via a downlink channel, a tone reservation report. The tone reservation report comprises an indication of whether tone reservation with separated tone reservation null indications is to be performed on a downlink transmission, a count of channel nulls in the downlink transmission, and a plurality of values representing respective tone reservation quantities of the channel nulls. The processor is further configured to receive, from the base station via the downlink channel, the downlink transmission. Additionally, the processor is further configured to estimate, according to the tone reservation report, location information of tone reservations in the downlink transmission. Additionally, the processor is further configured to decode, according to the location information of the tone reservations, the downlink transmission.

Another example aspect includes an apparatus of wireless communication at a UE of a wireless communication network, comprising means for receiving, from a base station via a downlink channel, a tone reservation report. The tone reservation report comprises an indication of whether tone reservation with separated tone reservation null indications is to be performed on a downlink transmission, a count of channel nulls in the downlink transmission, and a plurality of values representing respective tone reservation quantities of the channel nulls. The apparatus further includes means for receiving, from the base station via the downlink channel, the downlink transmission. Additionally, the apparatus further includes means for estimating, according to the tone reservation report, location information of tone reservations in the downlink transmission. Additionally, the apparatus further includes means for decoding, according to the location information of the tone reservations, the downlink transmission.

Another example aspect includes a computer-readable medium (e.g., non-transitory computer-readable medium) storing instructions of wireless communication at a UE of a wireless communication network, executable by a processor, to receive, from a base station via a downlink channel, a tone reservation report. The tone reservation report comprises an indication of whether tone reservation with separated tone reservation null indications is to be performed on a downlink transmission, a count of channel nulls in the downlink transmission, and a plurality of values representing respective tone reservation quantities of the channel nulls. The computer-readable medium storing further instructions to receive, from the base station via the downlink channel, the downlink transmission. Additionally, the computer-readable medium storing further instructions to estimate, according to the tone reservation report, location information of tone reservations in the downlink transmission. Additionally, the computer-readable medium storing further instructions to decode, according to the location information of the tone reservations, the downlink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
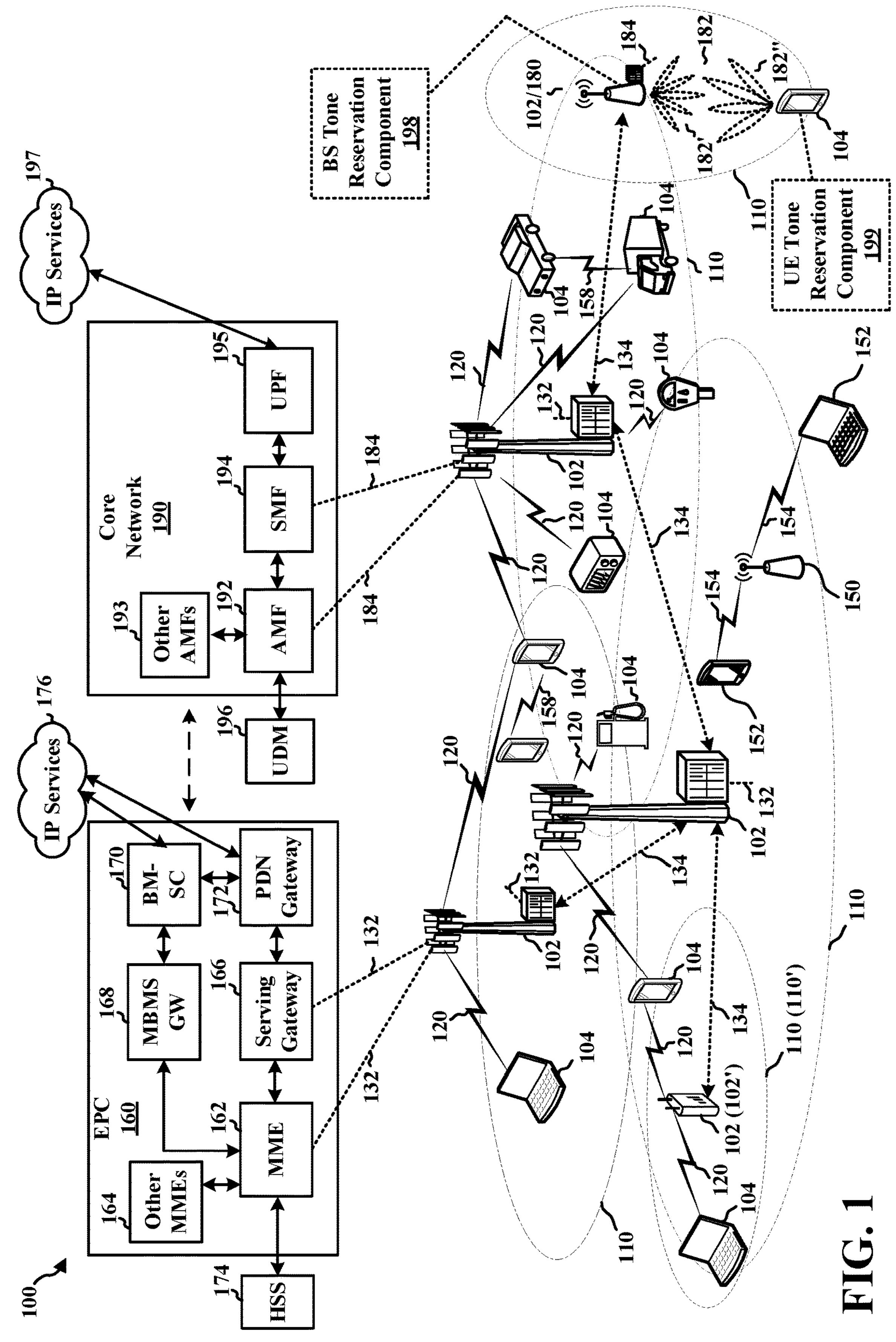
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conventional wireless communication systems may employ one or more transmission signaling techniques to attempt to maximize the use of system resources, such as bandwidth and throughput. For example, a transmitting device in such a wireless communication system (e.g., base station, user equipment (UE)) may transmit one or more signals to a receiving device (e.g., UE, base station) using orthogonal frequency division multiplexing (OFDM). However, power consumption requirements of signals generated by OFDM and other similar signaling techniques may be excessive. For example, OFDM signaling techniques may produce signals with a relatively high peak-to-average-power ratio (PAPR) when compared to signals generated with other signaling techniques. Such high-PAPR signals may require a power amplifier with a large power rating capable of transmitting the high-PAPR signals. Moreover, amplifying the high-PAPR signals may cause the power amplifier to operate at a lower efficiency than when amplifying signals with a lower PAPR. Thus, techniques to reduce a PAPR of signals generated using OFDM, and other similar signaling techniques, may be desirable.

One technique for reducing PAPR may be to perform tone reservation on a desired signal prior to amplification and/or transmission. To perform the tone reservation, a transmitting device may combine the desired signal with a tone reservation signal which may result in a signal with a reduced PAPR. That is, the tone reservation signal may be configured to reduce one or more amplitude peaks of the desired signal. The tone reservation signal may comprise one or more tones located at a set of reserved channel subcarriers. As a result, the set of reserved channel subcarriers used by the tone reservation signal may not be used by the desired signal for transmitting information, which may negatively impact throughput of the wireless communication system. For example, under certain channel conditions, the set of reserved channel subcarriers may correspond to subcarriers with a strong channel response (e.g., high signal-to-noise ratio (SNR)), and, as such, the desired signal may use other subcarriers in the channel having a comparatively weaker channel response (e.g., low SNR).

The negative impact to throughput caused by the tone reservation may be reduced by selecting a set of reserved channel subcarriers that correspond to nulls in the channel response. That is, the transmitting device may select a set of reserved channel subcarriers with a weak channel response (e.g., low SNR), and, as such, the desired signal may use subcarriers with a comparatively stronger channel response (e.g., high SNR). However, in such aspects, the transmitting device may transmit a report to the receiving device indicating the set of reserved channel subcarriers of the tone reservation signal such that the receiving device may decode the received transmission. Transmitting such a report may result in a significant increase in transmission overhead, which may negatively impact efficiency of the wireless communication system.

Aspects presented herein provide for multiple manners for a transmitting device to indicate, to a receiving device, separated tone reservation null indications for a tone reservation transmission. In some aspects, the receiving device may estimate, according to the tone reservation null indications, a set of reserved channel subcarriers used by the transmitting device to perform the tone reservation. Further, aspects presented herein may improve power consumption and signaling overhead, when compared to a conventional communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In certain aspects, the base stations 102 may include a base station (BS) tone reservation component 198. The BS tone reservation component 198 may be configured to perform tone reservation using a set of reserved channel subcarriers that correspond to nulls in a channel response, and to indicate tone reservation quantities of each reserved channel null. For example, the BS tone reservation component 198 may obtain a downlink channel response of a downlink channel, determine to perform tone reservation with separated tone reservation null indications on a downlink transmission, select a plurality of channel nulls, assign a tone reservation quantity to each channel null, send a tone reservation report, and send the downlink transmission.

Similarly, the UE 104 may include a UE tone reservation component 199. The UE tone reservation component 199 may be configured to estimate a plurality of channel nulls based on the tone reservation quantities of each reserved channel null, and to decode a downlink transmission according to the estimation. For example, the UE tone reservation component 199 may receive a tone reservation report, receive the downlink transmission, estimate location information of tone reservations in the downlink transmission, and decode the downlink transmission.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a “Sub-6 GHz” band in various documents and articles. A similar nomenclature issue sometimes occurs with regard to FR2, which is often referred to (interchangeably) as a “millimeter wave” (mmW) band in documents and articles, despite being different from the extremely high frequency (EHF) band (30 GHz-300 GHz) which is identified by the International Telecommunications Union (ITU) as a “millimeter wave” band.

With the above aspects in mind, unless specifically stated otherwise, it should be understood that the term “sub-6 GHz” or the like if used herein may broadly represent frequencies that may be less than 6 GHz, may be within FR1, or may include mid-band frequencies. Further, unless specifically stated otherwise, it should be understood that the term “millimeter wave” or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on sidelink, V2X, V2V, or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

Figures 2A, 2B, 2C, 2D:
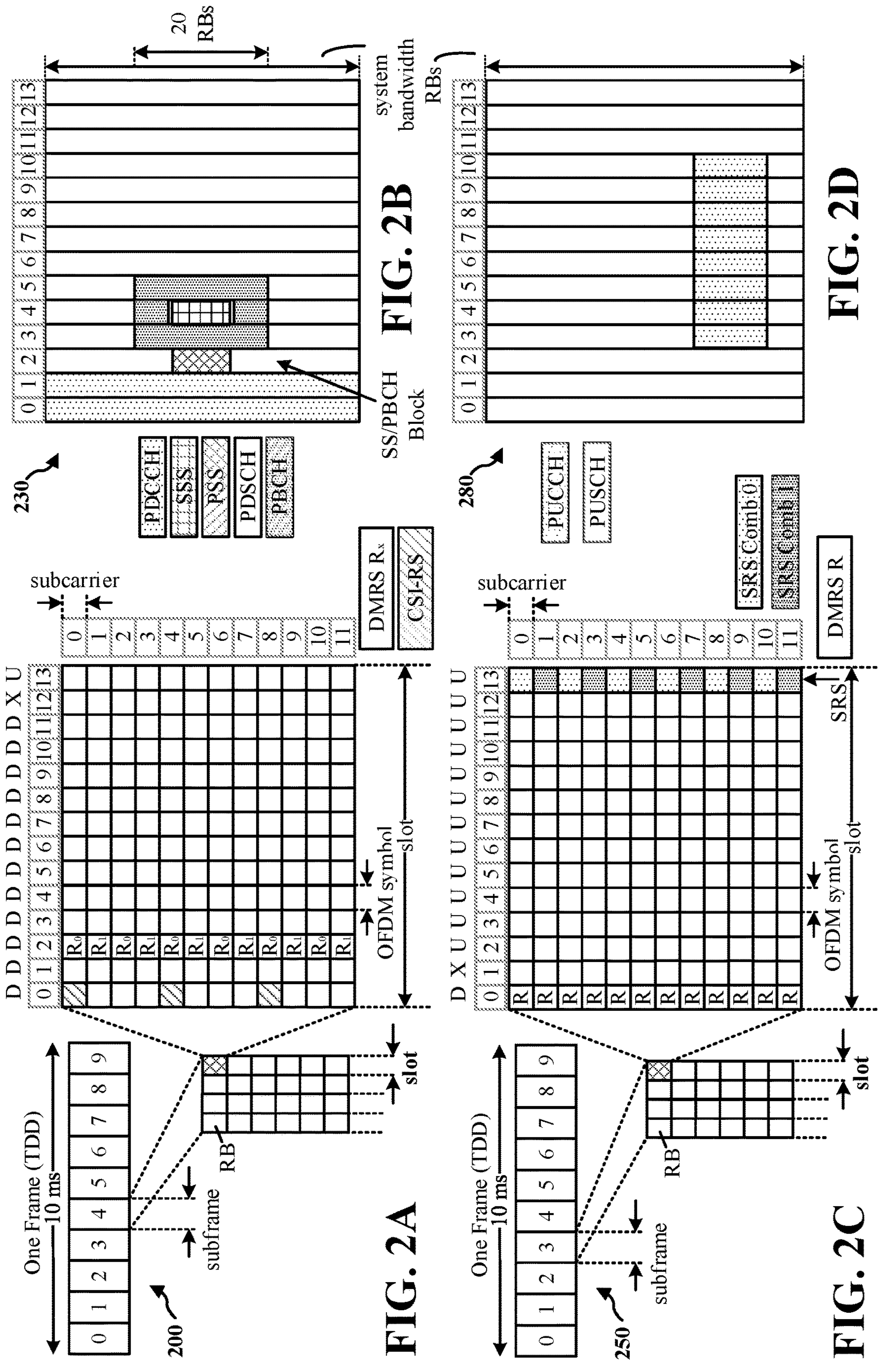
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. In such an example, the slot duration may be 0.25 milliseconds, the subcarrier spacing may be 60 kHz, and the symbol duration may be approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The PDCCH carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
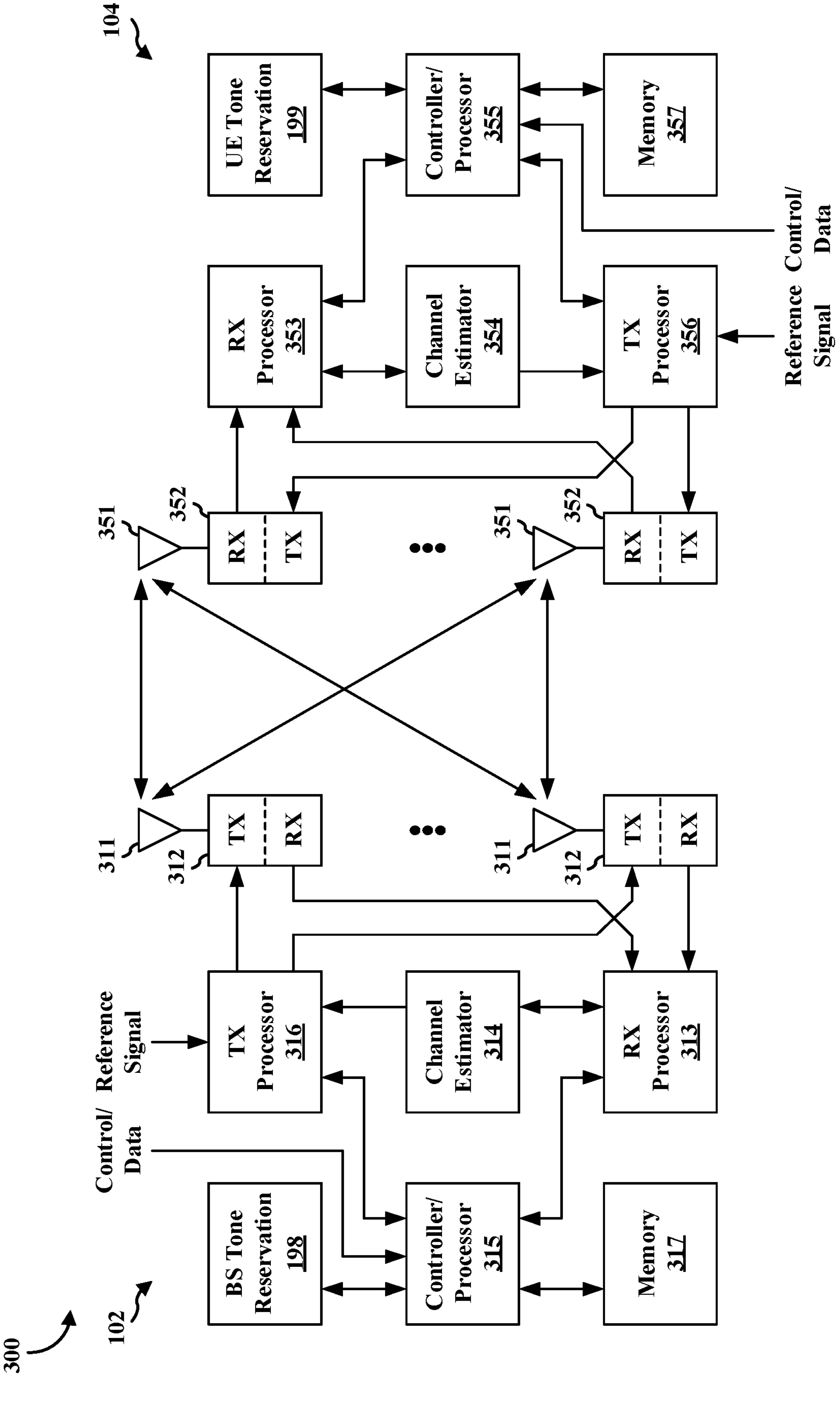
FIG. 3 is a diagram illustrating an example of hardware components of the base station and the UE in the access network, in accordance with various aspects of the present disclosure.

FIG. 3 is a block diagram 300 of example hardware components of a base station 102 in communication with a UE 104 in an access network. In the downlink, IP packets from the EPC 160 may be provided to a controller/processor 315. The controller/processor 315 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 315 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 313 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream may be spatially precoded to produce multiple spatial streams. Channel estimates from a channel estimator 314 may be used to determine the coding and modulation scheme, as well as for spatial processing. The channel estimate may be derived from a reference signal and/or channel condition feedback transmitted by the UE 104. Each spatial stream may then be provided to a different antenna 311 via a separate transmitter 312TX. Each transmitter 312TX may modulate an RF carrier with a respective spatial stream for transmission.

At the UE 104, each receiver 352RX may receive a signal through its respective antenna 351. Each receiver 352RX may recover information modulated onto an RF carrier and may provide the information to the receive (RX) processor 353. The TX processor 356 and the RX processor 353 may implement Layer 1 functionality associated with various signal processing functions. The RX processor 353 may perform spatial processing on the information to recover any spatial streams destined for the UE 104. If or when multiple spatial streams are destined for the UE 104, the multiple spatial streams may be combined by the RX processor 353 into a single OFDM symbol stream. The RX processor 353 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 354. The soft decisions may then be decoded and deinterleaved to recover the data and control signals that were originally transmitted by the base station 102 on the physical channel. The data and control signals may then be provided to the controller/processor 355, which may implement Layer 3 and Layer 2 functionality.

The controller/processor 355 can be associated with a memory 357 that stores program codes and data. The memory 357 may be referred to as a non-transitory computer-readable medium. The controller/processor 355 may provide demultiplexing between transport and logical channels, packet reassembly, deciphering, header decompression, and control signal processing to recover IP packets from the EPC 160. The controller/processor 355 is also responsible for error detection using an acknowledge (ACK) and/or negative acknowledge (NACK) protocol to support HARQ operations.

Similar to the functionality described in connection with the transmission by base station 102, the controller/processor 355 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 354 from a reference signal or feedback transmitted by the base station 102 may be used by the TX processor 356 to select the appropriate coding and modulation schemes, and to facilitate spatial processing. The spatial streams generated by the TX processor 356 may be provided to different antenna 351 via separate transmitters 352TX. Each transmitter 352TX may modulate an RF carrier with a respective spatial stream for transmission.

The uplink transmission may be processed at the base station 102 in a manner similar to that described in connection with the receiver function at the UE 104. Each receiver 312RX may receive a signal through its respective antenna 311. Each receiver 312RX may recover information modulated onto an RF carrier and may provide the information to a RX processor 313.

The controller/processor 315 may be associated with, and coupled with, a memory 317 that stores program codes and data. The memory 317 may be referred to as a non-transitory computer-readable medium. The controller/processor 315 may provide demultiplexing between transport and logical channels, packet reassembly, deciphering, header decompression, control signal processing to recover IP packets from the UE 104. IP packets from the controller/processor 315 may be provided to the EPC 160. The controller/processor 315 may also be responsible for error detection using an ACK and/or NACK protocol to support HARQ operations.

In some aspects, the base station 102 may comprise a BS tone reservation component 198. The BS tone reservation component 198 may be configured to perform tone reservation using a set of reserved channel subcarriers that correspond to nulls in a channel response, and to indicate tone reservation quantities of each reserved channel null. For example, the BS tone reservation component 198 may obtain a downlink channel response of a downlink channel, determine to perform tone reservation with separated tone reservation null indications on a downlink transmission, select a plurality of channel nulls, assign a tone reservation quantity to each channel null, send a tone reservation report, and send the downlink transmission.

In other aspects, at least one of the TX processor 316, the RX processor 313, and the controller/processor 315 may be configured to perform aspects in connection with the BS tone reservation component 198 of FIG. 1. For example, the memory 317 may store computer-executable instructions defining the BS tone reservation component 198. In other aspects, the TX processor 316, the RX processor 313, and/or the controller/processor 315 may be configured to execute the BS tone reservation component 198.

In some aspects, the UE 104 may comprise a UE tone reservation component 199. The UE tone reservation component 199 may be configured to estimate a plurality of channel nulls based on the tone reservation quantities of each reserved channel null, and to decode a downlink transmission according to the estimation. For example, the UE tone reservation component 199 may receive a tone reservation report, receive the downlink transmission, estimate location information of tone reservations in the downlink transmission, and decode the downlink transmission.

In other aspects, at least one of the TX processor 356, the RX processor 353, and the controller/processor 355 may be configured to perform aspects in connection with the UE tone reservation component 199 of FIG. 1. For example, the memory 357 may store computer-executable instructions defining the UE tone reservation component 199. In other aspects, the TX processor 356, the RX processor 353, and/or the controller/processor 259 may be configured to execute the UE tone reservation component 199.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Wireless communication systems operating in frequency ranges designated as mmWave (e.g., FR2 (24.25 GHz-52.6 GHz), EHF (30 GHz-300 GHz)) or sub-Terahertz (THz) (e.g., FR4 and beyond) may comprise bandwidth sizes exceeding 1 GHz. These bandwidth sizes may enable larger subcarrier spacing (SCS) sizes (e.g., up to 1 MHz) which linearly decrease the slot latency. However, a radio frequency (RF) power consumption of wireless communication systems operating at these frequency ranges may prevent network operators from deploying such wireless communication systems. For example, power amplifiers of a gNB (e.g., base station 102) of such a wireless communication system may consume thousands of watts to operate. Thus, techniques to reduce power consumption may be desirable.

For example, one such technique may comprise a peak-to-average-power ratio (PAPR) reduction scheme based on tone reservation. The tone reservation procedure may comprise combining a desired signal with a tone reservation signal to generate a signal with a reduced PAPR when compared to the desired signal. The tone reservation signal may comprise one or more tones located at a set of reserved channel subcarriers (e.g., resource elements) of a transmission channel.

In some aspects, a tone reservation algorithm may reserve a set of subcarriers at preconfigured or fixed tone reservation locations of the tone reservation signal. Alternatively or additionally, the tone reservation algorithm may reserve a set of subcarriers where a channel response of the transmission channel is weak (e.g., low SNR) for the tone reservation locations of the tone reservation signal. That is, the transmitting device may determine the set of subcarriers based on the channel response. In such aspects, the tone reservation procedure may result in a smaller impact on performance (e.g., throughput) as the dynamically selected tone reservation locations may use subcarriers with low capability of transmitting data, when compared to reserving fixed tone reservation locations that, under certain channel conditions, may have a high capability of transmitting data.

Figure 4:
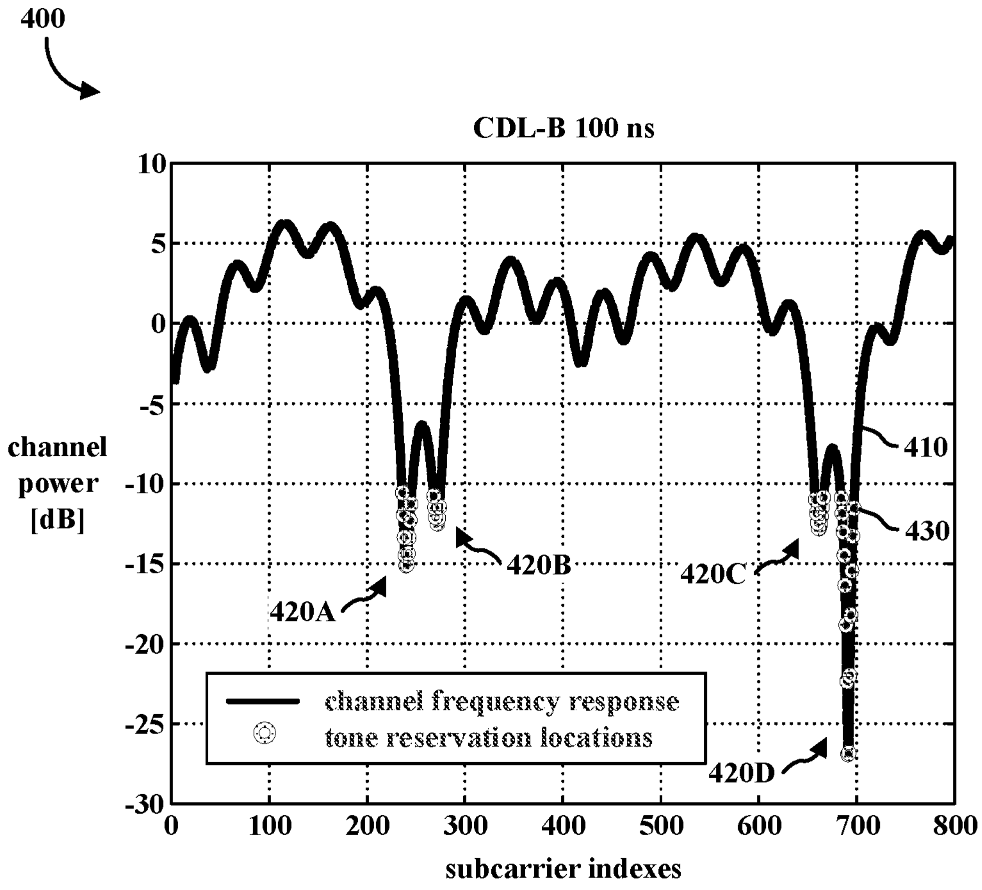
FIG. 4 is a diagram illustrating an example of a channel response, in accordance with various aspects of the present disclosure.

For example, a transmitting device may obtain a channel frequency response 410, as shown in FIG. 4. The channel frequency response 410 may indicate a channel power of the transmission channel as a function of subcarrier indexes (e.g., frequency). In some aspects, the transmitting device may obtain the channel frequency response 410 based on a channel estimation of a demodulation reference signal (DMRS). For example, the transmitting device (e.g., base station 102) may send a DMRS, via a downlink channel, to a receiving device (e.g., UE 104), and the receiving device may perform one or more measurements on the DMRS to determine the channel frequency response 410. In other aspects, the transmitting device may receive a sounding reference signal (SRS) from the receiving device and the transmitting device may estimate the channel frequency response 410 based on the SRS.

The transmitting device may determine one or more subcarriers associated with a lowest energy level and/or a smallest throughput capacity of the transmission channel. The transmitting device may group the one or more subcarriers into one or more groups according to a distance (e.g., number of subcarrier indexes) between the one or more subcarriers. Such groups of subcarriers may be generally referred to as channel nulls (e.g., 420A-420D, generally referred to as "420"). That is, each of the channel nulls 420 may refer to a group of one or more co-located subcarriers having a comparatively lower channel response when compared to the remaining subcarriers in the channel. In some aspects, the channel nulls 420 may comprise channel subcarriers having a channel power that does not satisfy (e.g., is lower) a predetermined threshold (e.g., −10 dB).

The transmitting device may select one or more tone reservation locations (e.g., subcarriers) 430 associated with the channel nulls 420 indicated by the channel response 410. In some aspects, the transmitting device may select a predetermined quantity of tone reservation locations 430. The predetermined quantity may be defined as a predetermined quantity of subcarriers (e.g., 32 subcarriers) and/or as a predetermined percentage of a total number of subcarriers in the transmission channel (e.g., 4%). In other aspects, the transmitting device may determine a quantity of tone reservation locations 430 according to transmission channel conditions.

Although the example channel frequency response 410 depicted in FIG. 4 shows a particular channel frequency response with a particular quantity of channel nulls 420 (e.g., 420A-420D), it should be understood that the channel frequency response 410 may differ without deviating from the scope of the present disclosure. Notably, the present disclosure may be employed in any wireless communication system in which a tone reservation procedure selects tone reservation locations 430 based on a channel frequency response 410.

Figure 5:
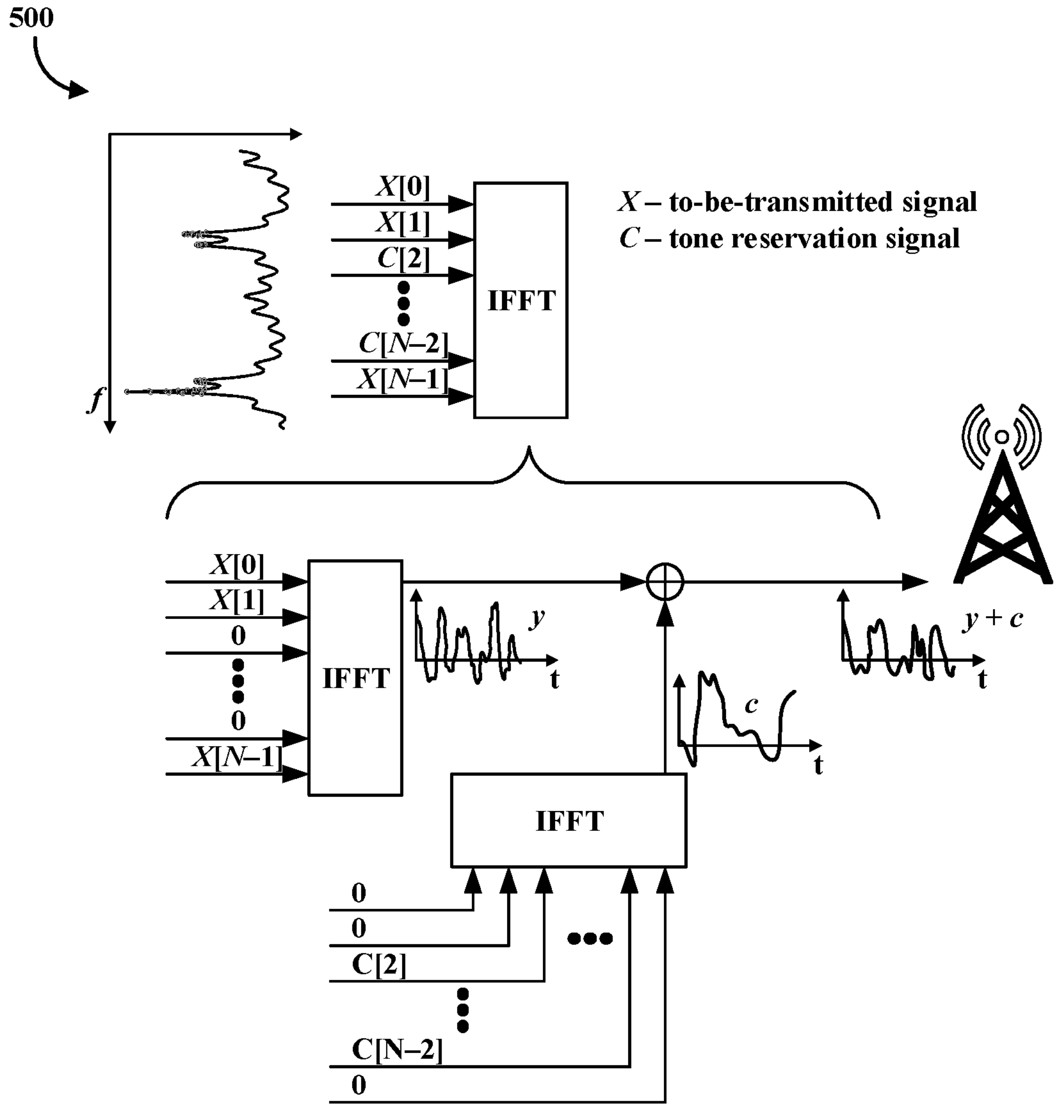
FIG. 5 is a diagram illustrating an example of a tone reservation procedure, in accordance with various aspects of the present disclosure.

Referring to FIG. 5, diagram 500 illustrates an example of a tone reservation procedure 500 that may reduce a PAPR of a desired signal. The tone reservation procedure 500 may be performed by a transmitting device (e.g., base station 102, UE 104) to reduce a PAPR of a transmission to a receiving device (e.g., UE 104, base station 102). In some aspects, the base station 102 may be configured as the transmitting device and the UE 104 may be configured as the receiving device. Alternatively or additionally, the base station 102 may be configured as the receiving device and the UE 104 may be configured as the transmitting device.

In some aspects, the transmitting device may determine channel response information of a transmission channel. For example, the channel response may comprise a channel frequency response (e.g., channel frequency response 410 of FIG. 4). Alternatively or additionally, the channel response information may comprise one or more additional parameters associated with the transmission channel, such as, signal-to-interference-plus-noise ratio (SINR), signal-to-noise ratio (SNR), a delay spread report, and the like. Based on the channel response information, the transmitting device may determine a tone reservation signal C, as described above in reference to FIG. 4. That is, the transmitting device may determine a set of tone reservation locations 430 for transmitting one or more tones of the tone reservation signal C.

The transmitting device may apply at least a portion of the tone reservation signal C to channel subcarriers corresponding to the one or more tone reservation locations. For example, as shown in FIG. 5, the transmitting device may apply the tone reservation signal C to channel subcarrier [2] and channel subcarrier [N−2] from the N input subcarriers in the transmission channel. The transmitting device may apply at least a portion of the desired signal X to the remaining channel subcarriers. The transmitting device may apply the combined signals (e.g., X and C) to an inverse fast Fourier transform (IFFT) and convert the combined signals from a frequency domain to a time domain to produce a reduced PAPR signal (e.g., y+c).

Alternatively or additionally, the transmitting device may separately convert the desired signal X from the frequency domain to the time domain with a first IFFT, resulting in intermediate signal y. In addition, the transmitting device may separately convert the tone reservation signal C from the frequency domain to the time domain with a second IFFT, resulting in intermediate signal c. The transmitting device may combine (e.g., direct sum, linear sum) intermediate signals y and c to produce the reduced PAPR signal (e.g., y+c).

Figure 6A:
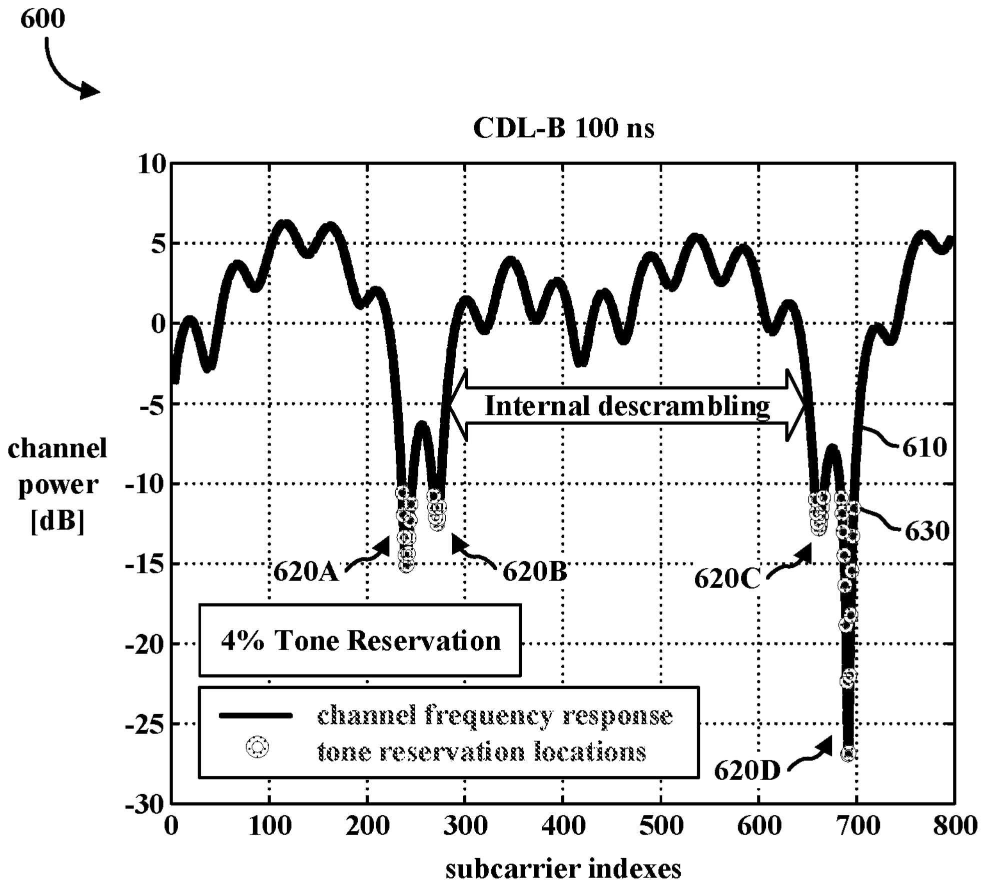
FIG. 6A is a diagram illustrating an example of an internal descrambling error, in accordance with various aspects of the present disclosure.

Referring to FIG. 6A, diagram 600 illustrates a channel frequency response 610 comprising channel nulls 620A-620D (generally referred to as "620"). As described in further detail above in reference to FIGS. 4-5, a transmitting device may select tone reservation locations 630 according to the channel nulls 620 indicated by the channel frequency response 610. In some aspects, the base station 102 may be configured as the transmitting device and the UE 104 may be configured as the receiving device. Alternatively or additionally, the base station 102 may be configured as the receiving device and the UE 104 may be configured as the transmitting device.

In some aspects, the transmitting device may report, to the receiving device, locations (e.g., subcarrier indexes) of the set of tone reservation locations 630 selected by the transmitting device for the tone reservation procedure. The receiving device may utilize the reported tone reservation locations to decode the transmitted signal. That is, the receiving device may omit processing the channel subcarriers comprising the tone reservation signal as reported by the transmitting device. However, such a report may be excessively large and negatively impact signaling overhead.

In other aspects, the transmitting device may report, to the receiving device, a total quantity of tone reservation locations 630 selected by the transmitting device for the tone reservation procedure. For example, the total quantity of tone reservation locations 630 may be represented as a quantity of subcarriers (e.g., 32 subcarriers) and/or as a percentage of a total number of subcarriers in the transmission channel (e.g., 4%). Such a report may require a considerably smaller amount of data to transmit, when compared to reporting the locations of the set of tone reservation locations, and, thus, improve signaling overhead.

In such aspects, the receiving device may estimate the tone reservation locations based on the reported total quantity of tone reservation locations 630 and an estimated channel frequency response. That is, the receiving device may determine one or more subcarriers as channel nulls using a same selection criteria as the transmitting device (e.g., lowest energy level, smallest throughput capacity) and estimate tone reservation locations for each channel null by allocating the total quantity of tone reservation locations among the channel nulls.

However, in certain channel conditions, the receiving device may not allocate a same number of tone reservation locations to a channel null as the transmitting device. Such a discrepancy may result in an error that may generally be referred to as an internal descrambling error. For example, referring to FIG. 6A, the transmitting device may allocate ten (10) tone reservation locations to each of channel nulls 620B and 620C, and the receiving device may allocate nine (9) tone reservation locations to channel null 620B and eleven (11) tone reservation locations to channel null 620C. As a result, the receiving device may process one subcarrier associated with channel null 620B that may contain a tone reservation signal, and may omit processing one subcarrier associated with channel null 620C that may contain a desired signal. That is, while the transmitting device and the receiving device both allocated the same total number of tone reservation locations (e.g., twenty), the decoding procedure at the receiving device may have an internal descrambling error starting at channel null 620B that may not be corrected until after channel null 620C is processed.

Figure 6B:
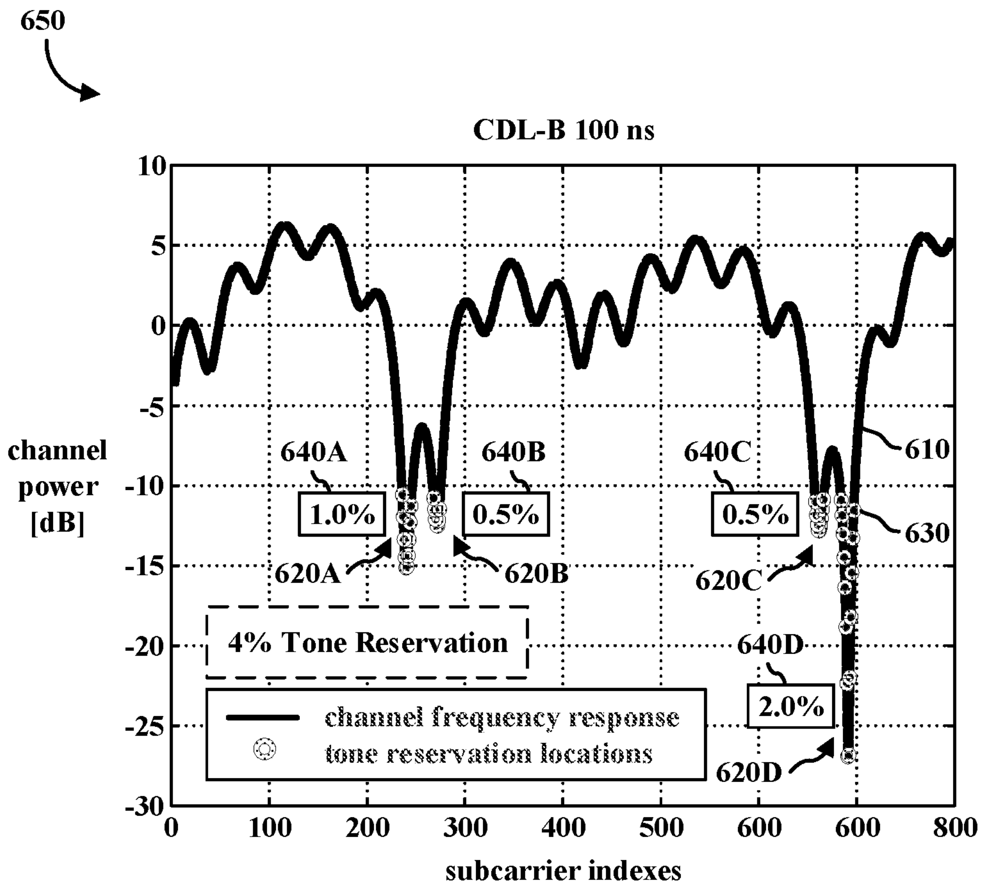
FIG. 6B is a diagram illustrating an example of separated tone reservation null indications, in accordance with various aspects of the present disclosure.

Referring to FIG. 6B, diagram 650 illustrates separated tone reservation null indications for each channel null 620 in channel frequency response 610. As described in further detail above in reference to FIGS. 4-5 and 6A, a transmitting device may select tone reservation locations 630 according to the channel nulls 620 indicated by the channel frequency response 610. In some aspects, the base station 102 may be configured as the transmitting device and the UE 104 may be configured as the receiving device. Alternatively or additionally, the base station 102 may be configured as the receiving device and the UE 104 may be configured as the transmitting device. The base station 102 may include a BS reservation component 198. The UE 104 may include a UE tone reservation component 199.

In some aspects, the transmitting device may report, to the receiving device, a separate tone reservation null indication (e.g., 640A-640D, generally referred to as "640") for each channel null 620 indicated by the channel frequency response 610. The separate tone reservation null indications 640 may be represented as a quantity of subcarriers (e.g., 4, 8, 16 subcarriers) and/or a percentage of the total quantity of subcarriers in the transmission channel (e.g., 0.5%, 1.0%, 2.0%). A sum of the separate tone reservation null indications 640 may match the total quantity of tone reservation locations of the transmission channel (e.g., 32 subcarriers, 4.0%).

In such aspects, the receiving device may estimate the tone reservation locations of each channel null according to the reported separate tone reservation null indications 640. As such, an estimation error of the location of the tone reservation locations may not result in a significant internal descrambling error.

Thus, aspects presented herein provide for a dynamic tone reservation procedure with separate tone reservation null indications that may provide improved performance over conventional tone reservation procedures by dynamically selecting subcarriers with a weak channel response for a tone reservation signal configured to reduce a PAPR of a desired signal. Further, the aspects presented herein may require less signaling overhead and be less sensitive to descrambling errors due to estimation errors by the receiving device when compared to conventional tone reservation procedures.

Figure 7:
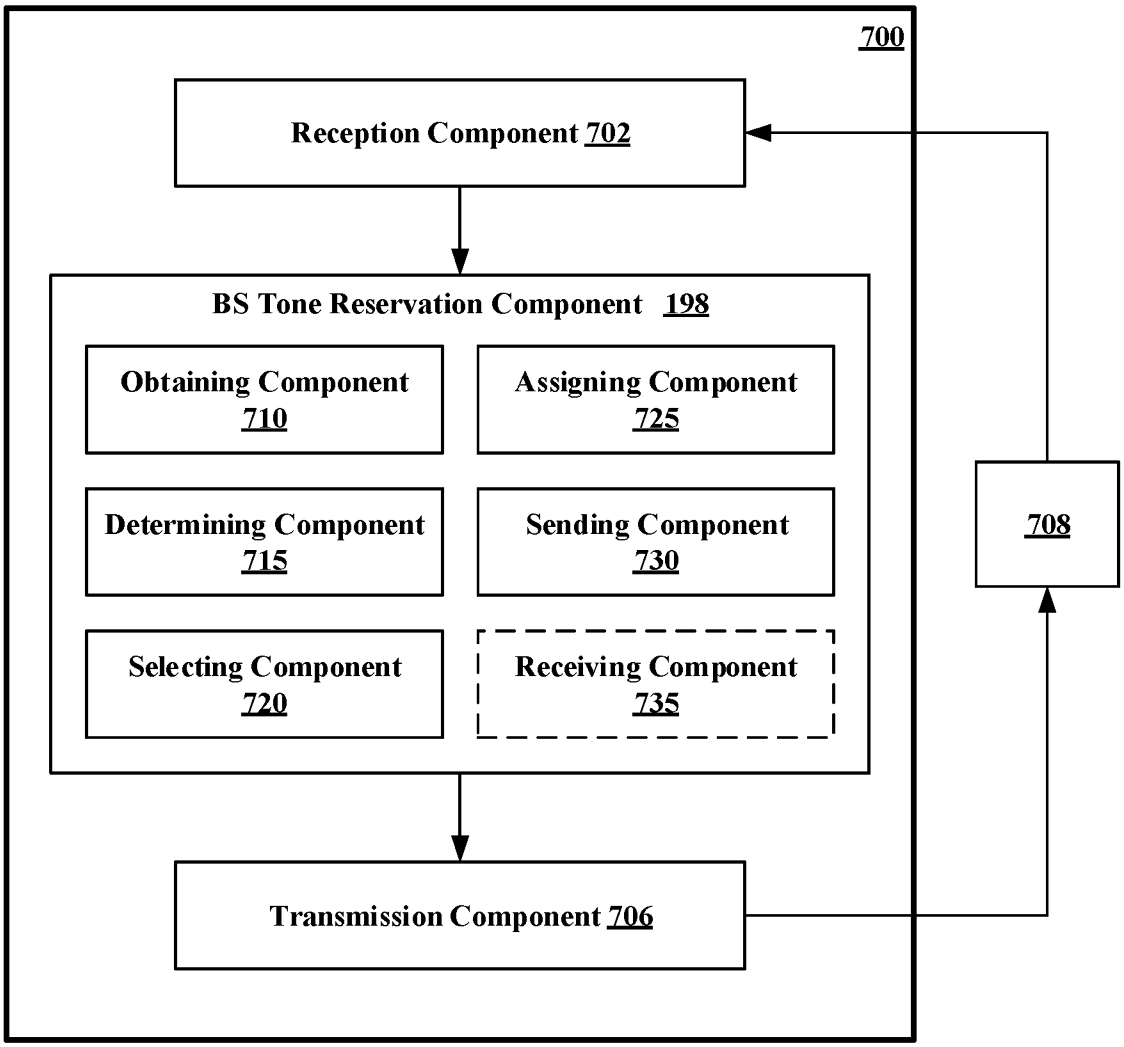
FIG. 7 is a diagram illustrating an example apparatus, such as a base station, for wireless communication, in accordance with various aspects of the present disclosure.

FIG. 7 is a block diagram of an example apparatus 700 for wireless communication. The apparatus 700 may be a base station 102 (e.g., base station 102 of FIGS. 1 and 3-5 and 6A-6B) or a base station 102 may include the apparatus 700. In some aspects, the apparatus 700 may include a reception component 702 configured to receive wireless communications from another apparatus (e.g., apparatus 708), a BS tone reservation component 198 configured to perform tone reservation using a set of reserved channel subcarriers that correspond to nulls in a channel response and to indicate tone reservation quantities of each reserved channel null, a transmission component 706 configured to transmit wireless communications to another apparatus (e.g., apparatus 708), and which may be in communication with one another (e.g., via one or more buses or electrical connections). As shown, the apparatus 700 may be in communication with another apparatus 708 (such as a UE 104, or another wireless communication device) using the reception component 702 and the transmission component 706.

In some aspects, the apparatus 700 may be configured to perform one or more operations described herein in connection with FIGS. 1, 3-5, and 6A-6B. Alternatively or additionally, the apparatus 700 may be configured to perform one or more processes described herein, such as method 800 of FIGS. 8-10. In some aspects, the apparatus 700 may include one or more components of the base station 102 described above in connection with FIGS. 1, 3-5, and 6A-6B.

The reception component 702 may receive communications, such as reference signals, control information, data communications, or a combination thereof, from the apparatus 708. The reception component 702 may provide received communications to one or more other components of the apparatus 700, such as the BS tone reservation component 198. In some aspects, the reception component 702 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the base station 102 described above in connection with FIGS. 1, 3-5, and 6A-6B.

The transmission component 706 may transmit communications, such as reference signals, control information, data communications, or a combination thereof, to the apparatus 708. In some aspects, the BS tone reservation component 198 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In other aspects, the transmission component 706 may include one or more antennas, a modulator, a transmit MIMO processor, a transmit processor, a controller/processor, a memory, or a combination thereof, of the base station 102 described above in connection with FIGS. 1,3-5, and 6A-6B. In some aspects, the transmission component 706 may be co-located with the reception component 702 in a transceiver or transceiver component.

The BS tone reservation component 198 may be configured to perform tone reservation using a set of reserved channel subcarriers that correspond to nulls in a channel response, and to indicate tone reservation quantities of each reserved channel null. In some aspects, the BS tone reservation component 198 may include a set of components, such as an obtaining component 710 configured to obtain a downlink channel response of a downlink channel, a determining component 715 configured to determine to perform tone reservation with separated tone reservation null indications on a downlink transmission, a selecting component 720 configured to select a plurality of channel nulls, an assigning component 725 configured to assign a tone reservation quantity to each channel null, and a sending component 730 configured to send a tone reservation report and to send the downlink transmission. In other optional or additional aspects, the BS tone reservation component 198 may include a receiving component 735 configured to receive an SRS.

Alternatively or additionally, the set of components may be separate and distinct from the BS tone reservation component 198. In other aspects, one or more components of the set of components may include or may be implemented within a controller/processor (e.g., the TX processor 316, the RX processor 313, the controller/processor 315), a memory (e.g., the memory 317), or a combination thereof, of the base station 102 described in FIGS. 1, 3-5, and 6A-6B. Alternatively or additionally, one or more components of the set of components may be implemented at least in part as software stored in a memory, such as the memory 317. For example, a component (or a portion of a component) may be implemented as computer-executable instructions or code stored in a non-transitory computer-readable medium and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIGS. 1, 3-5, and 6A-6B.

Referring to FIGS. 8-11, in operation, a base station 102 may perform a method 800 of wireless communication. The method 800 may be performed by the base station 102 (which may include the memory 317 and which may be the entire base station 102 and/or one or more components of the base station 102 such as the BS tone reservation component 198, the TX processor 316, the RX processor 313, and/or the controller/processor 315). The method 800 may be performed by the BS tone reservation component 198 in communication with the UE 104.

Figure 8:
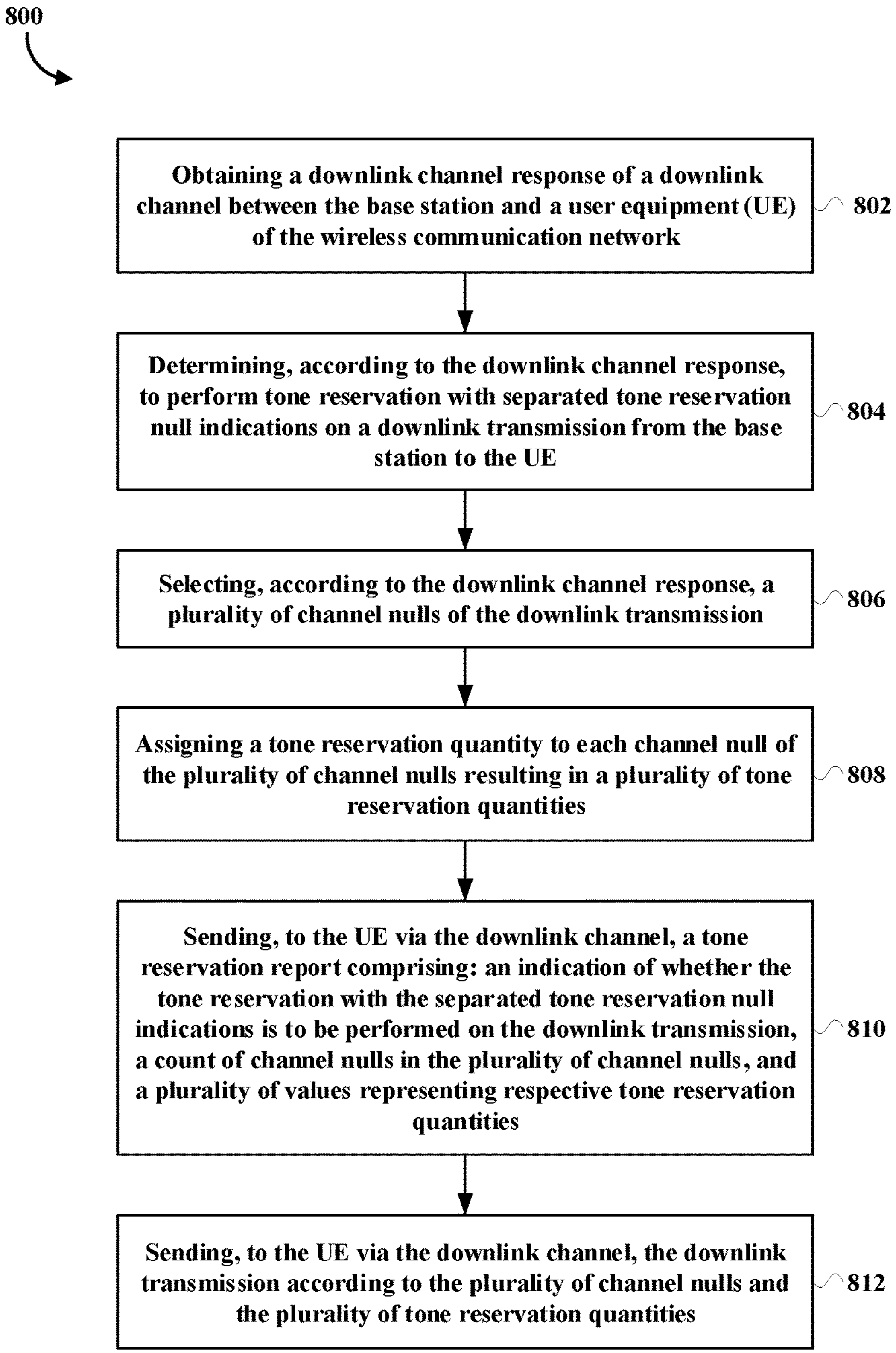
FIG. 8 is a flowchart of a method of wireless communication at a base station, in accordance with various aspects of the present disclosure.

At block 802 of FIG. 8, the method 800 includes obtaining a downlink channel response of a downlink channel between the base station and a UE of the wireless communication network. For example, in an aspect, the base station 102, the BS tone reservation component 198, and/or the obtaining component 710 may be configured to or may comprise means for obtaining a downlink channel response (e.g., 410, 610) of a downlink channel between the base station 102 and a UE 104 of the wireless communication network 100.

For example, the obtaining at block 802 may include determining the downlink channel frequency response. That is, the base station 102 may determine a power of a downlink signal as a function of frequency.

In some aspects, the UE 104 may determine the downlink channel frequency response. For example, the base station 102 may send, via the downlink channel, a DMRS to the UE 104, and the UE 104 may determine the downlink channel frequency response according to measurements of the DMRS. In such aspects, the UE 104 may send the downlink channel frequency response to the base station 102. For example, the UE 104 may send, to the base station 102, a representation of the downlink channel frequency response in the time domain and/or the frequency domain. Alternatively or additionally, the representation may be compressed (i.e., reduced data size).

In other optional or additional aspects, the base station 102 may receive, from the UE 104 via an uplink channel, one or more SRSs. The UE 104 may send the one or more SRSs in a periodic and/or aperiodic (e.g., on demand) manner. In such aspects, the base station 102 may perform one or more measurements on the one or more SRSs to estimate an uplink channel response. The base station 102 may determine that the downlink channel response may be similar to the uplink channel response. For example, in a wireless communication system using TDD and/or operating at frequency ranges designated as mmWave (e.g., FR2 (24.25 GHz-52.6 GHz), EHF (30 GHz-300 GHz)) or sub-Terahertz (THz) (e.g., FR4 and beyond), a downlink channel may have a similar channel response as the uplink channel, which may be referred to as channel reciprocity. Alternatively or additionally, the base station 102 may determine a channel reciprocity between the downlink channel and the uplink channel based on one or more channel conditions. For example, the downlink channel and the uplink channel may have channel reciprocity if or when the uplink channel satisfies a high SNR threshold and/or does not satisfy (e.g., is lower) a low delay spread threshold. As such, the base station 102 may estimate, based on the channel reciprocity and the uplink channel response, the downlink channel response.

Further, for example, the obtaining at block 802 may be performed to obtain the downlink channel response with which to select a set of tone reservation locations associated with subcarriers of the downlink channel with a weak channel response (e.g., low SNR). Thus, the wireless communication system 100 may dynamically select tone reservation locations that may reduce performance impact (e.g., throughput) when compared to conventional tone reservation procedures.

At block 804 of FIG. 8, the method 800 includes determining, according to the downlink channel response, to perform tone reservation with separated tone reservation null indications on a downlink transmission from the base station to the UE. For example, in an aspect, the base station 102, the BS tone reservation component 198, and/or the determining component 715 may be configured to or may comprise means for determining, according to the downlink channel response (e.g., 410, 610), to perform tone reservation with separated tone reservation null indications on a downlink transmission from the base station 102 to the UE 104.

For example, the determining at block 804 may include determining whether to perform the tone reservation on the downlink transmission. That is, the determining at block 804 may include determining whether the downlink channel frequency response 410, 610 indicates a PAPR that satisfies a high PAPR threshold. For example, if or when the PAPR indicated by the downlink channel frequency response 410, 610 satisfies the high PAPR threshold, the base station 102 may determine to perform the tone reservation. Alternatively or additionally, if or when the PAPR indicated by the downlink channel frequency response 410, 610 does not satisfy (e.g., is lower) the high PAPR threshold, the base station 102 may determine not to perform the tone reservation.

In other optional or additional aspects, the determining at block 804 may include determining whether to perform tone reservation with separated tone reservation null indications. That is, the determining at block 804 may include determining whether the downlink channel frequency response 410, 610 indicates a low likelihood that an estimation error by the UE 104 may cause a significant descrambling error. For example, the base station 102 may determine not to perform tone reservation with separated tone reservation null indications if or when the downlink channel frequency response 410, 610 indicates one channel null (e.g., 420, 620). In another example, the base station 102 may determine not to perform tone reservation with separated tone reservation null indications if or when distances (e.g., number of subcarrier indexes) between the channel nulls 420, 620 do not satisfy a minimum distance threshold. That is, the channel nulls 420, 620 may be located close to each other, and, as such, an internal descrambling error may not cause a significant performance impact.

Further, for example, the determining at block 804 may be performed to determine whether channel conditions are such that performing tone reservation with separated tone reservation null indications may improve performance (e.g., power consumption, throughput) as compared to not performing the tone reservation. Thus, aspects presented herein may maximize performance and reduce overhead based on current channel conditions, when compared to conventional tone reservation procedures.

At block 806 of FIG. 8, the method 800 includes selecting, according to the downlink channel response, a plurality of channel nulls of the downlink transmission. For example, in an aspect, the base station 102, the BS tone reservation component 198, and/or the selecting component 720 may be configured to or may comprise means for selecting, according to the downlink channel response (e.g., 410, 610), a plurality of channel nulls (e.g., 420, 620) of the downlink transmission.

For example, the selecting at block 806 may include identifying, based on the downlink channel response (e.g., 410, 610), a set of channel subcarriers matching a selection criteria configured to identify channel subcarriers associated with a lowest energy level or a smallest throughput capacity of the downlink channel. That is, the base station 102 may identify a set of channel subcarriers having a weak channel response when compared to the remaining channel subcarriers. The selection criteria may be preconfigured and provided to the base station 102 (e.g., transmitting device) and to the UE 104 (e.g., receiving device). Alternatively or additionally, the base station 102 may determine the selection criteria and may provide the selection criteria to the UE 104. For example, the selection criteria may identify subcarriers having a channel power that does not satisfy (e.g., is lower) a predetermined threshold (e.g., −10 dB). Alternatively or additionally, the selection criteria may identify subcarriers having a channel power that does not satisfy a threshold determined according to a minimum channel power indicated by the downlink channel response 410, 610. For example, if or when a minimum channel power indicated by the downlink channel response 410, 610 is −27 dB, the selection criteria may identify subcarriers having a channel power less than 10 dB above the minimum (e.g., −17 dB).

In some aspects, the selection criteria used by the base station 102 (e.g., transmitting device) may match the selection criteria used by the UE 104 (e.g., receiving device). That is, the base station 102 and the UE 104 may identify matching sets of channel subcarriers if or when the downlink channel frequency responses used by the base station 102 and the UE 104 match.

In other optional or additional aspects, the selecting at block 806 may include selecting, based on the set of channel subcarriers matching the selection criteria, a plurality of channel nulls 420, 620. For example, the base station 102 may group the set of channel subcarriers into channel nulls 420, 620. That is, each channel null 420, 620 may comprise one or more channel subcarriers in which distances (e.g., number of subcarrier indexes) between the one or more channel subcarriers do not satisfy a null distance threshold.

In other optional or additional aspects, the selecting at block 806 may include limiting a number of channel nulls 420, 620 to a predetermined maximum channel null count. The predetermined maximum channel null count may be selected according to a size threshold of a tone reservation report. Alternatively or additionally, the maximum channel null count may be determined according to channel conditions. For example, the base station 102 may reduce a quantity of channel nulls 420, 620 if or when the quantity of channel nulls 420, 620 exceeds the maximum channel null count.

In other optional or additional aspects, the selecting at block 806 may include determining that a first channel null from the plurality of channel nulls is similar to a second channel null from the plurality of channel nulls, according to respective energy levels or respective subcarrier indexes of the first channel null and the second channel null. That is, the base station 102 may determine a high likelihood of an channel response estimation error by the UE 104 (e.g., receiving device) if or when the channel frequency response 410, 610 indicates two channel nulls (i.e., first channel null and second channel null) that may have similar energy levels and/or similar subcarrier indexes. For example, referring to FIG. 6B, if or when the base station 102 selects channel nulls 640A, 640C, and 640D for tone reservation, there may be a high likelihood that the UE 104 may estimate channel nulls 640A, 640B, and 640D for decoding the transmitted signal, since channel nulls 640B and 640C may have similar respective energy levels. In such an aspect, the base station 102 may discard, in response to determining that the first channel null is similar to the second channel null, the second channel null from the plurality of channel nulls (e.g., 640C). That is, the base station 102 may perform the tone reservation procedure using channel nulls 640A and 640D. Alternatively or additionally, the base station 102 may add the first channel null (e.g., 640B) to the tone reservation procedure. That is, the base station 102 may perform the tone reservation procedure using channel nulls 640A, 640B, 640C, and 640D.

Further, for example, the selecting at block 806 may be performed to identify subcarriers for performing tone reservation according to the channel frequency response 410, 610. Thus, aspects presented herein provide for the wireless communication system 100 to dynamically select tone reservation locations that may reduce performance impact (e.g., throughput) when compared to conventional tone reservation procedures. Further, the number of channel nulls may be adjusted to minimize signaling overhead and descrambling errors.

At block 808 of FIG. 8, the method 800 includes assigning a tone reservation quantity to each channel null of the plurality of channel nulls resulting in a plurality of tone reservation quantities. For example, in an aspect, the base station 102, the BS tone reservation component 198, and/or the assigning component 725 may be configured to or may comprise means for assigning a tone reservation quantity to each channel null of the plurality of channel nulls (e.g., 420, 620) resulting in a plurality of tone reservation quantities (e.g., 430, 630).

For example, the assigning at block 808 may include determining a total quantity of tone reservations for the downlink transmission. In some aspects, the total quantity of tone reservations may be a predetermined quantity of tone reservation locations. That is, the total quantity of tone reservations may be previously known by the base station 102 (e.g., transmitting device) and the UE 104 (e.g., receiving device). Alternatively or additionally, the base station 102 may determine a quantity of tone reservation locations according to transmission channel conditions.

In other optional or additional aspects, the total quantity of tone reservations may be represented as a quantity of subcarriers (e.g., 32 subcarriers) and/or as a percentage of a total number of subcarriers in the transmission channel (e.g., 4%). Alternatively or additionally, the total quantity of tone reservations may be represented as a quantized value (e.g., rounded, truncated, mapped value) of the total quantity of tone reservations.

In other optional or additional aspects, the assigning at block 808 may include assigning a portion of the total quantity of the tone reservations to each channel null 420, 620, wherein a sum of the plurality of tone reservation quantities matches the total quantity of the tone reservations. That is, the base station 102 may apportion the total quantity of tone reservations across the plurality of channel nulls 420, 620. For example, the base station 102 may select a number of tone reservation locations corresponding to each channel null of the plurality of channel nulls 420, 620, such that the total quantity of the tone reservations are allocated to a corresponding channel null. Referring to FIG. 6B as an example, the base station 102 may assign 1.0% of the channel subcarriers (or 8 channel subcarriers) corresponding to channel null 620A to tone reservation locations 630, 0.5% of the channel subcarriers (or 4 channel subcarriers) corresponding to channel null 620B to tone reservation locations 630, 0.5% of the channel subcarriers (or 4 channel subcarriers) corresponding to channel null 620C to tone reservation locations 630, and 2.0% of the channel subcarriers (or 16 channel subcarriers) corresponding to channel null 620D to tone reservation locations 630. In addition, the total quantity of assigned channel subcarriers (i.e., 4.0% or 32 channel subcarriers) may match the total quantity of the tone reservations.

Further, for example, the assigning at block 808 may be performed to dynamically select subcarriers with a weak channel response for a tone reservation signal configured to reduce a PAPR of a desired signal. In addition, the assigning at block 808 may be performed to determine separated tone reservation null indications that may be reported to a receiving device (e.g., UE 104) to reduce a likelihood of internal descrambling errors.

At block 810 of FIG. 8, the method 800 includes sending, to the UE via the downlink channel, a tone reservation report comprising: an indication of whether the tone reservation with the separated tone reservation null indications is to be performed on the downlink transmission, a count of channel nulls in the plurality of channel nulls, and a plurality of values representing respective tone reservation quantities. For example, in an aspect, the base station 102, the BS tone reservation component 198, and/or the sending component 730 may be configured to or may comprise means for sending, to the UE 104 via the downlink channel, a tone reservation report comprising: an indication of whether the tone reservation with the separated tone reservation null indications is to be performed on the downlink transmission, a count of channel nulls in the plurality of channel nulls (e.g., 420, 620), and a plurality of values representing respective tone reservation quantities.

For example, the sending at block 810 may include sending the tone reservation report in a periodic and/or aperiodic (e.g., on demand) manner. In some aspects, the base station 102 may send the tone reservation report to the UE 104 via radio resource control (RRC) signaling, medium access control (MAC) control element (MAC-CE) signaling, or downlink control information (DCI) signaling.

In other optional or additional aspects, each value of the plurality of values representing the respective tone reservation quantities in the tone reservation report may comprise a percentage of the total quantity (e.g., 0.5%, 1.0%, 2.0%) of the tone reservations for the downlink transmission. That is, the tone reservation quantities for the channel nulls may be represented as a percentage of the total quantity of the tone reservations. In other optional or additional aspects, the tone reservation quantities may be represented as a quantity of subcarriers (e.g., 4, 8, 32 subcarriers). Alternatively or additionally, the tone reservation quantities may be represented as quantized values (e.g., rounded, truncated, mapped value) of the total quantity of tone reservations.

Further, for example, the sending at block 810 may be performed to indicate to the UE 104 that the base station 102 is performing tone reservation with the separated tone reservation null indications on the downlink transmission. In addition, the sending at block 810 may be performed to provide the UE 104 (e.g., receiving device) with the tone reservation null indications that the UE 104 may use to estimate tone reservation locations for each channel null in the downlink channel frequency response. Thus, aspects presented herein may prevent or reduce estimation errors of the location of the tone reservation locations from resulting in a significant internal descrambling error.

At block 812 of FIG. 8, the method 800 includes sending, to the UE via the downlink channel, the downlink transmission according to the plurality of channel nulls and the plurality of tone reservation quantities. For example, in an aspect, the base station 102, the BS tone reservation component 198, and/or the sending component 730 may be configured to or may comprise means for sending, to the UE 104 via the downlink channel, the downlink transmission according to the plurality of channel nulls (e.g., 420, 620) and the plurality of tone reservation quantities.

For example, the sending at block 812 may include performing a tone reservation procedure on a desired signal for the downlink transmission. As described in further detail in reference to FIG. 5, the tone reservation procedure may comprise combining a frequency domain version of the desired signal X with a tone reservation signal C at the tone reservation locations 430, 630 that have been determined according to the downlink channel frequency response 410, 610. The combined signal may be converted from the frequency domain to the time domain using an IFFT to produce a reduced PAPR signal that may be amplified and/or sent to the UE 104 (e.g., receiving device). That is, the reduced PAPR signal may have a lower PAPR than the desired signal X Alternatively or additionally, the frequency domain version of the desired signal X and the tone reservation signal C may be separately converted from the frequency domain to the time domain using respective IFFTs. The resulting intermediate time domain signals (i.e., y and c) may be combined (e.g., direct sum, linear sum) to produce the reduced PAPR signal (e.g., y+c).

Further, for example, the sending at block 812 may be performed to send the desired signal in the downlink transmission with a reduced PAPR using tone reservation based on dynamically selected subcarriers with a weak channel response. Thus, aspects presented herein provide for a dynamic tone reservation procedure with separate tone reservation null indications that may provide improved performance over conventional tone reservation procedures by dynamically selecting subcarriers with a weak channel response for a tone reservation signal configured to reduce a PAPR of a desired signal. Further, the aspects presented herein may require less signaling overhead and be less sensitive to descrambling errors due to estimation errors by the receiving device when compared to conventional tone reservation procedures.

Figure 9:
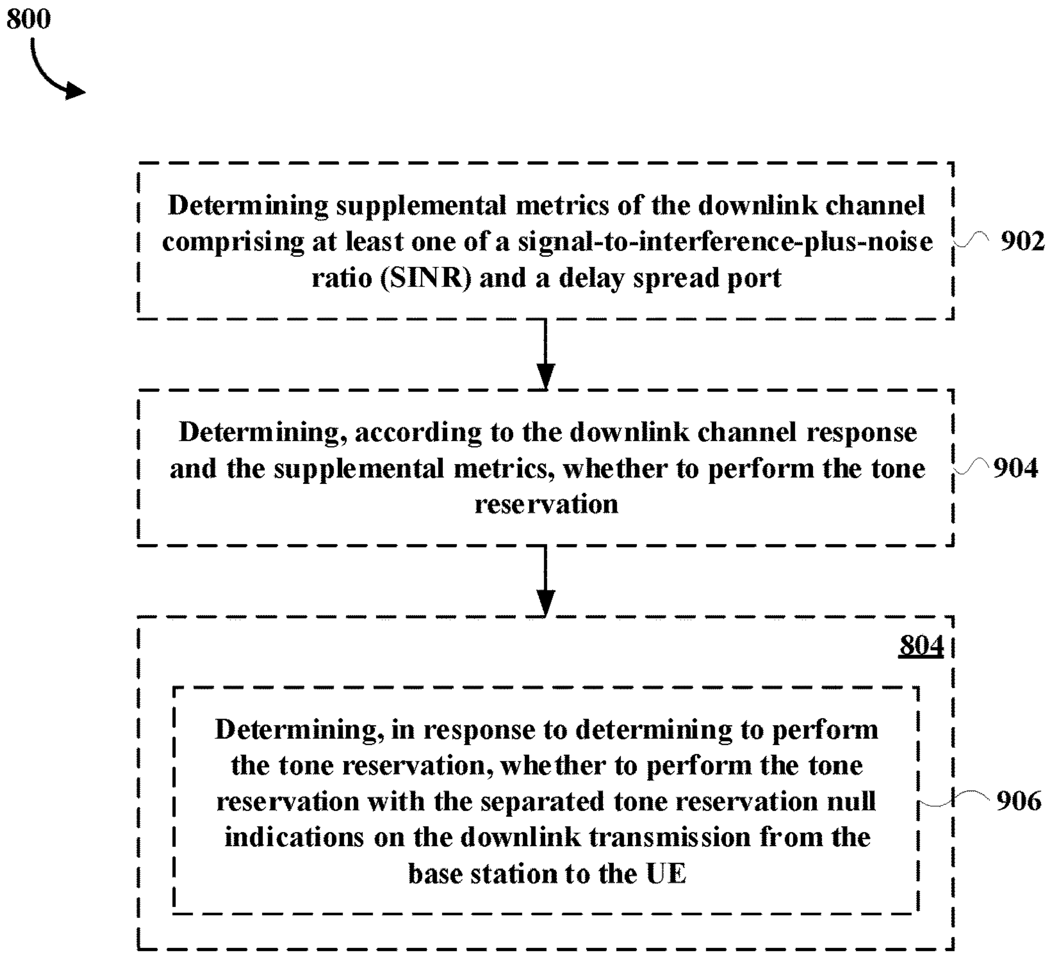
FIG. 9 is a flowchart of first additional or optional steps for the method of wireless communication at the base station in accordance with various aspects of the present disclosure.

Referring to FIG. 9, in an optional or additional aspect that may be combined with any other aspect, at block 902, the determining at block 804 of determining, according to the downlink channel response, to perform tone reservation with separated tone reservation null indications on a downlink transmission from the base station to the UE includes determining supplemental metrics of the downlink channel comprising at least one of a signal-to-interference-plus-noise ratio (SINR) and a delay spread report. For example, in an aspect, the base station 102, the BS tone reservation component 198, and/or the determining component 715 may be configured to or may comprise means for determining supplemental metrics of the downlink channel comprising at least one of a SINR and a delay spread report.

For example, the determining at block 902 may include determining, according to the downlink channel frequency response, supplemental metrics of the downlink channel comprising at least the SINR, a SNR, and the delay spread report.

In some aspects, the determining at block 902 may include receiving, from the UE 104, the supplemental metrics of the downlink channel comprising at least the SINR, the SNR, and the delay spread report.

Further, for example, the determining at block 902 may be performed to determine supplemental parameters of the downlink channel that may be used to determine whether to perform tone reservation with separated tone reservation null indications on the downlink transmission.

In this optional or additional aspect, at block 904, the determining at block 804 of determining, according to the downlink channel response, to perform tone reservation with separated tone reservation null indications on a downlink transmission from the base station to the UE includes determining, according to the downlink channel response and the supplemental metrics, whether to perform the tone reservation. For example, in an aspect, the base station 102, the BS tone reservation component 198, and/or the determining component 715 may be configured to or may comprise means for determining, according to the downlink channel response (e.g., 410, 610) and the supplemental metrics, whether to perform the tone reservation.

For example, the determining at block 904 may include determining whether to perform the tone reservation on the downlink transmission. That is, the determining at block 904 may include determining whether the downlink channel frequency response 410, 610 and the supplemental metrics indicate a PAPR that satisfies a high PAPR threshold. For example, if or when the PAPR indicated by the downlink channel frequency response 410, 610 and the supplemental metrics satisfies the high PAPR threshold, the base station 102 may determine to perform the tone reservation. Alternatively or additionally, if or when the PAPR indicated by the downlink channel frequency response 410, 610 and the supplemental metrics does not satisfy (e.g., is lower) the high PAPR threshold, the base station 102 may determine not to perform the tone reservation.

Further, for example, the determining at block 904 may be performed to determine whether channel conditions are such that performing tone reservation may improve performance (e.g., power consumption, throughput) as compared to not performing the tone reservation. Thus, aspects presented herein may maximize performance and reduce overhead based on current channel conditions, when compared to conventional tone reservation procedures.

In this optional or additional aspect, at block 906, the determining at block 804 of determining, according to the downlink channel response, to perform tone reservation with separated tone reservation null indications on a downlink transmission from the base station to the UE includes determining, in response to determining to perform the tone reservation, whether to perform the tone reservation with the separated tone reservation null indications on the downlink transmission from the base station to the UE. For example, in an aspect, the base station 102, the BS tone reservation component 198, and/or the determining component 715 may be configured to or may comprise means for determining, in response to determining to perform the tone reservation, whether to perform the tone reservation with the separated tone reservation null indications on the downlink transmission from the base station to the UE.

For example, the determining at block 906 may include determining whether the downlink channel frequency response 410, 610 and the supplemental metrics indicates a low likelihood that an estimation error by the UE 104 may cause a significant descrambling error. In some aspects, the base station 102 may determine not to perform tone reservation with separated tone reservation null indications if or when the SINR or the SNR of the downlink channel satisfy a high SNR threshold. Alternatively or additionally, the base station 102 may determine to perform tone reservation with separated tone reservation null indications if or when the SINR or the SNR of the downlink channel does not satisfy (e.g., is lower) the high SNR threshold. In other optional or additional aspects, the base station 102 may determine to perform tone reservation with separated tone reservation null indications if or when the delay spread of the downlink channel does not satisfy (e.g., is lower) a delay spread threshold. Alternatively or additionally, the base station 102 may determine to not perform tone reservation with separated tone reservation null indications if or when the delay spread of the downlink channel does satisfies the delay spread threshold.

Further, for example, the determining at block 906 may be performed to may be performed to determine whether channel conditions are such that performing tone reservation with separated tone reservation null indications may improve performance (e.g., power consumption, throughput) as compared to not performing the tone reservation. Thus, aspects presented herein may maximize performance and reduce overhead based on current channel conditions, when compared to conventional tone reservation procedures.

Figure 10:
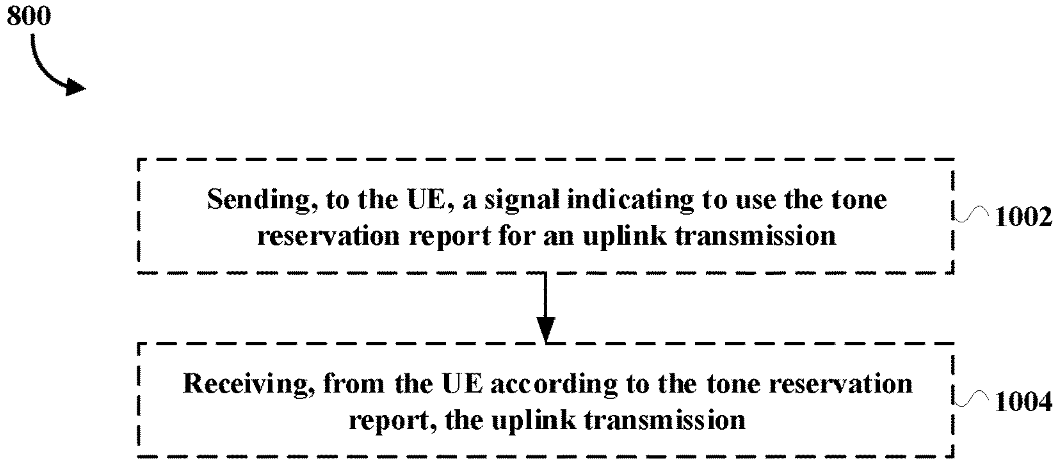
FIG. 10 is a flowchart of second additional or optional steps for the method of wireless communication at the base station in accordance with various aspects of the present disclosure.

Referring to FIG. 10, in an optional or additional aspect that may be combined with any other aspect, at block 1002, the method 800 includes sending, to the UE, a signal indicating to use the tone reservation report for an uplink transmission. For example, in an aspect, the base station 102, the BS tone reservation component 198, and/or the sending component 730 may be configured to or may comprise means for sending, to the UE 104, a signal indicating to use the tone reservation report for an uplink transmission.

For example, the sending at block 1002 may include sending the signal indicating to use the tone reservation report for the uplink transmission via RRC signaling, MAC-CE signaling, and/or DCI signaling. The base station 102 may send the signal indicating to use the tone reservation report for the uplink transmission in a periodic and/or aperiodic (e.g., on demand) manner.

Further, for example, the sending at block 1002 may be performed to indicate to the UE 104 to perform an uplink transmission using tone reservation with separated tone reservation null indications. In such an uplink transmission, the base station 102 may be configured as a receiving device and the UE 104 may be configured as a transmitting device.

In this optional or additional aspect, at block 1004, the method 800 includes receiving, from the UE according to the tone reservation report, the uplink transmission. For example, in an aspect, the base station 102, the BS tone reservation component 198, and/or the receiving component 735 may be configured to or may comprise means for receiving, from the UE according to the tone reservation report, the uplink transmission.

For example, the receiving at block 1004 may include decoding, according to the tone reservation locations 430, 630, the uplink transmission.

Further, for example, the receiving at block 1004 may be performed to receive a desired signal in the uplink transmission with a reduced PAPR using tone reservation based on dynamically selected subcarriers with a weak channel response. Thus, aspects presented herein provide for a dynamic tone reservation procedure with separate tone reservation null indications that may provide improved performance over conventional tone reservation procedures by dynamically selecting subcarriers with a weak channel response for a tone reservation signal configured to reduce a PAPR of a desired signal. Further, the aspects presented herein may require less signaling overhead and be less sensitive to descrambling errors due to estimation errors by the receiving device when compared to conventional tone reservation procedures.

Figure 11:
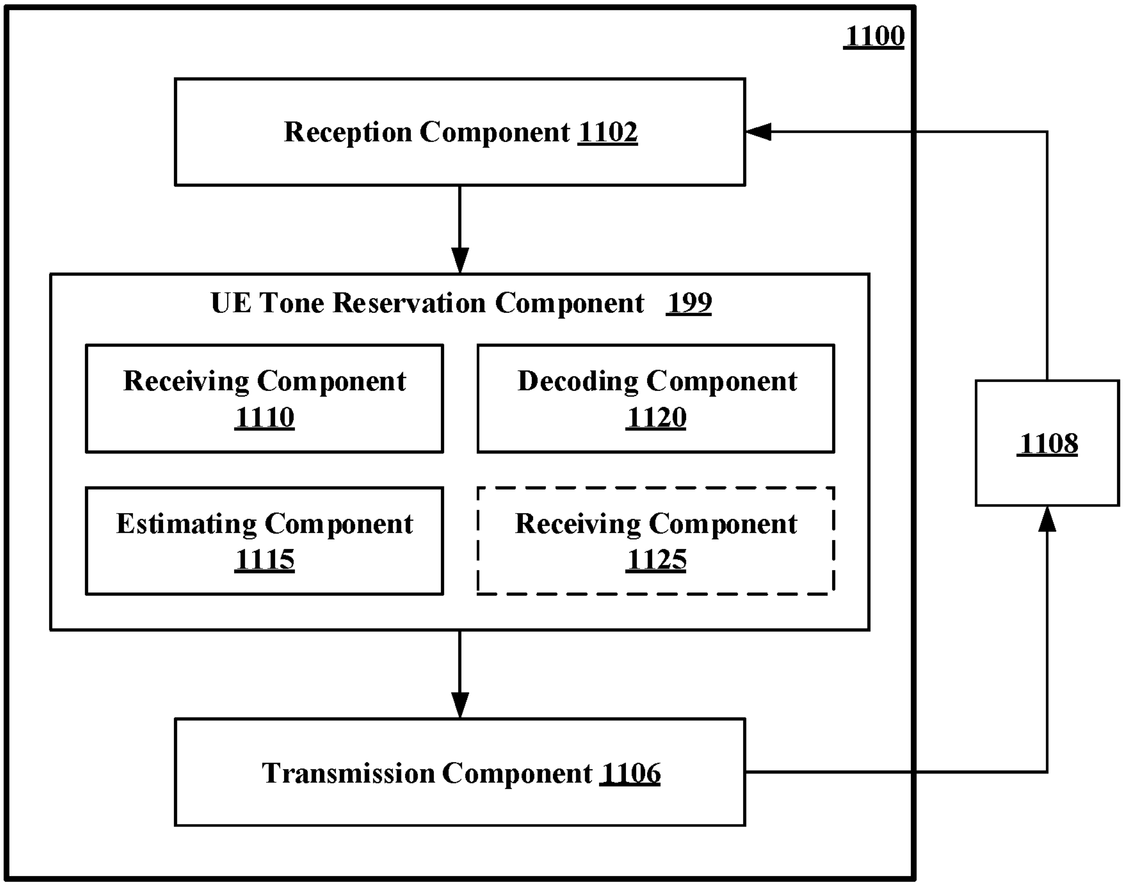
FIG. 11 is a diagram illustrating an example apparatus, such as a user equipment (UE), for wireless communication, in accordance with various aspects of the present disclosure.

FIG. 11 is a block diagram of an example apparatus 1100 for wireless communication. The apparatus 1100 may be a UE 104 (e.g., UE 104 of FIGS. 1 and 3-5 and 6A-6B) or a UE 104 may include the apparatus 1100. In some aspects, the apparatus 1100 may include a reception component 1102 configured to receive wireless communications from another apparatus (e.g., apparatus 108), a UE tone reservation component 199 configured to may be configured to estimate a plurality of channel nulls based on the tone reservation quantities of each reserved channel null and to decode a downlink transmission according to the estimation, a transmission component 1106 configured to transmit wireless communications to another apparatus (e.g., apparatus 1108), and which may be in communication with one another (e.g., via one or more buses or electrical connections). As shown, the apparatus 1100 may be in communication with another apparatus 1108 (such as a base station 102, or another wireless communication device) using the reception component 1102 and the transmission component 1106.

In some aspects, the apparatus 1100 may be configured to perform one or more operations described herein in connection with FIGS. 1 and 3-5 and 6A-6B. Alternatively or additionally, the apparatus 1100 may be configured to perform one or more processes described herein, such as method 1200 of FIGS. 12-13. In some aspects, the apparatus 1100 may include one or more components of the UE 104 described above in connection with FIGS. 1 and 3-5 and 6A-6B.

The reception component 1102 may receive communications, such as reference signals, control information, data communications, or a combination thereof, from the apparatus 1108. The reception component 1102 may provide received communications to one or more other components of the apparatus 1100, such as the UE tone reservation component 199. In some aspects, the reception component 1102 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the UE 104 described above in connection with FIGS. 1 and 3-5 and 6A-6B.

The transmission component 1106 may transmit communications, such as reference signals, control information, data communications, or a combination thereof, to the apparatus 1108. In some aspects, the UE tone reservation component 199 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In other aspects, the transmission component 1106 may include one or more antennas, a modulator, a transmit MIMO processor, a transmit processor, a controller/processor, a memory, or a combination thereof, of the UE 104 described above in connection with FIGS. 1 and 3-5 and 6A-6B. In some aspects, the transmission component 1106 may be co-located with the reception component 1102 in a transceiver or transceiver component.

The UE tone reservation component 199 may be configured to estimate a plurality of channel nulls based on the tone reservation quantities of each reserved channel null, and to decode a downlink transmission according to the estimation. In some aspects, the UE tone reservation component 199 may include a set of components, such as an receiving component 1110 configured to receive a tone reservation report and to receive the downlink transmission, an estimating component 1115 configured to estimate location information of tone reservations in the downlink transmission, and a decoding component 1120 configured to decode the downlink transmission. In other optional or additional aspects, the UE tone reservation component 199 may include a sending component 1125 configured to send an uplink transmission.

Alternatively or additionally, the set of components may be separate and distinct from the UE tone reservation component 199. In other aspects, one or more components of the set of components may include or may be implemented within a controller/processor (e.g., the TX processor 356, the RX processor 353, the controller/processor 355), a memory (e.g., the memory 357), or a combination thereof, of the UE 104 described in FIGS. 1, 3-5, and 6A-6B. Alternatively or additionally, one or more components of the set of components may be implemented at least in part as software stored in a memory, such as the memory 357. For example, a component (or a portion of a component) may be implemented as computer-executable instructions or code stored in a non-transitory computer-readable medium and executable by a controller or a processor to perform the functions or operations of the component.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIGS. 1, 3-5, and 6A-6B.

Figure 12:
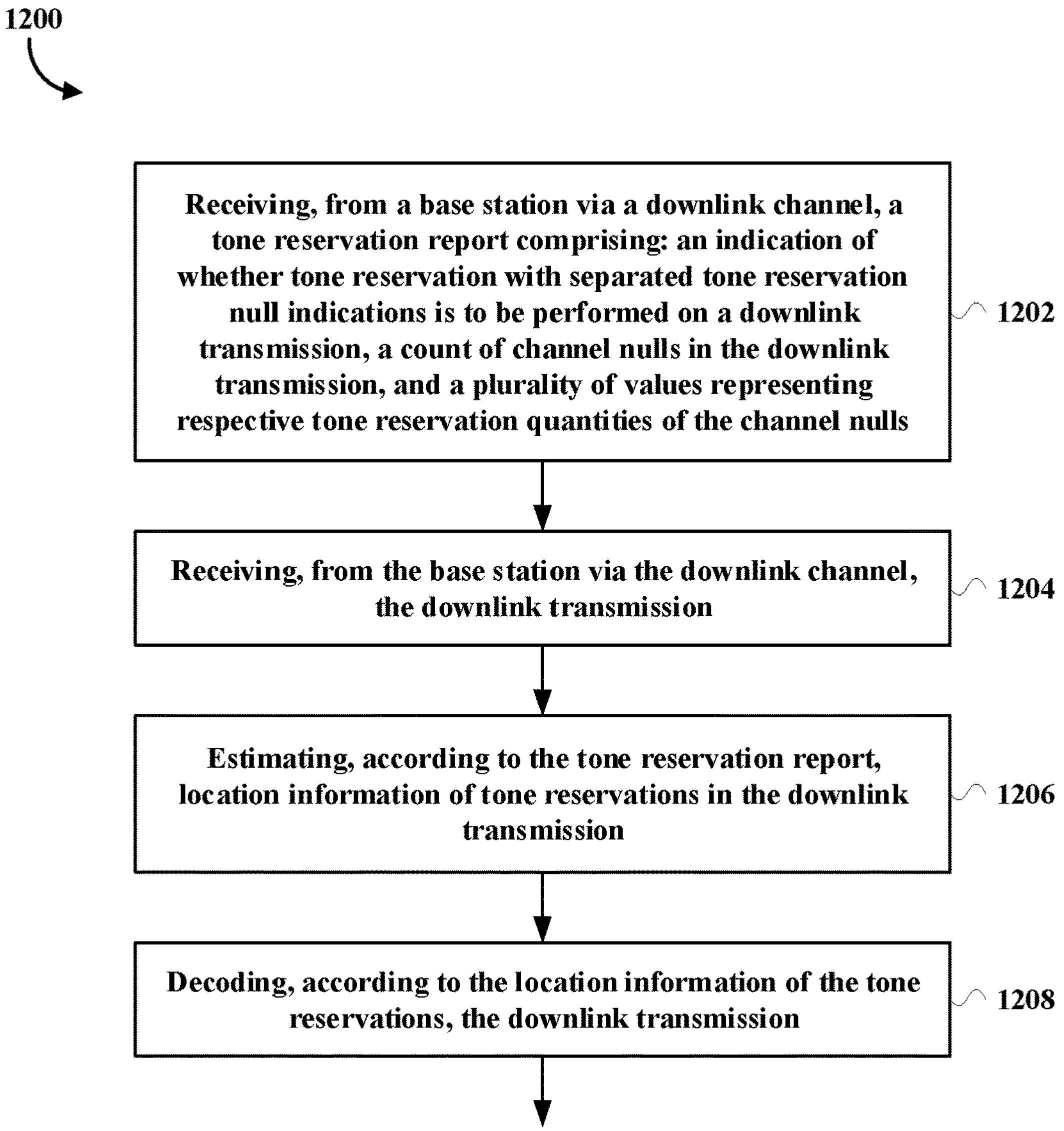
FIG. 12 is a flowchart of a method of wireless communication at a UE, in accordance with various aspects of the present disclosure.
Figure 13:
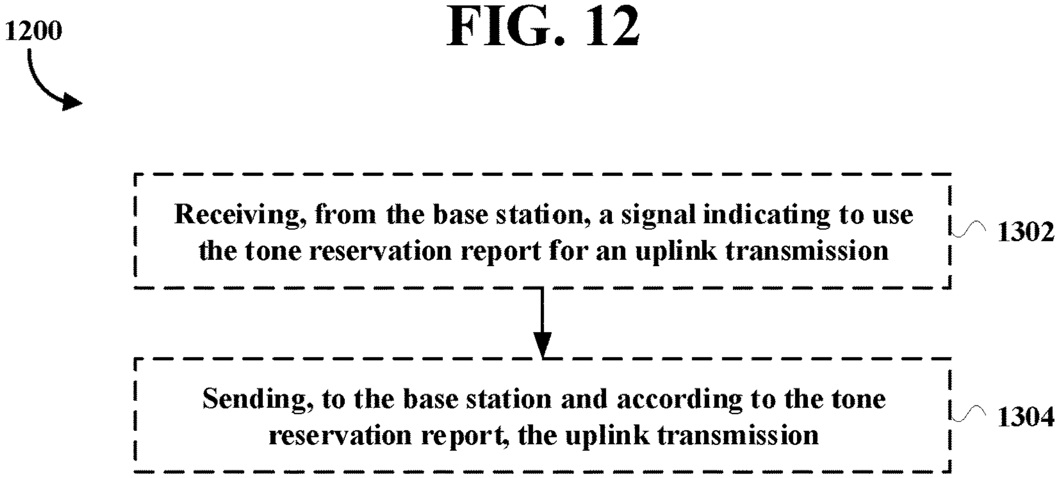
FIG. 13 is a flowchart of additional or optional steps for the method of wireless communication at the UE in accordance with various aspects of the present disclosure.

Referring to FIGS. 12-13, in operation, a UE 104 may perform a method 1200 of wireless communication. The method 1200 may be performed by the UE 104 (which may include the memory 357 and which may be the entire UE 104 and/or one or more components of the UE 104 such as the UE tone reservation component 199, the TX processor 356, the RX processor 353, and/or the controller/processor 355). The method 1200 may be performed by the UE tone reservation component 199 in communication with the base station 102.

At block 1202 of FIG. 12, the method 1200 includes receiving, from a base station via a downlink channel, a tone reservation report comprising: an indication of whether tone reservation with separated tone reservation null indications is to be performed on a downlink transmission, a count of channel nulls in the downlink transmission, and a plurality of values representing respective tone reservation quantities of the channel nulls. For example, in an aspect, the UE 104, the UE tone reservation component 199, and/or the receiving component 1110 may be configured to or may comprise means for receiving, from a base station 102 via a downlink channel, a tone reservation report comprising: an indication of whether tone reservation with separated tone reservation null indications is to be performed on a downlink transmission, a count of channel nulls in the downlink transmission, and a plurality of values representing respective tone reservation quantities of the channel nulls.

For example, the receiving at block 1202 may include receiving RRC signaling, MAC-CE signaling, or DCI signaling comprising the tone reservation report. The UE 104 may receive the tone reservation report in a periodic and/or aperiodic (e.g., on demand) manner.

In some aspects, each value of the plurality of values representing the respective tone reservation quantities in the tone reservation report may comprise a percentage of the total quantity (e.g., 0.5%, 1.0%, 2.0%) of the tone reservations for the downlink transmission. That is, the tone reservation quantities for the channel nulls may be represented as a percentage of the total quantity of the tone reservations. In other optional or additional aspects, the tone reservation quantities may be represented as a quantity of subcarriers (e.g., 4, 8, 32 subcarriers). Alternatively or additionally, the tone reservation quantities may be represented as quantized values (e.g., rounded, truncated, mapped value) of the total quantity of tone reservations.

Further, for example, the receiving at block 1202 may be performed to indicate to the UE 104 that the base station 102 is performing tone reservation with the separated tone reservation null indications on the downlink transmission. In addition, the receiving at block 1202 may be performed to provide the UE 104 (e.g., receiving device) with the tone reservation null indications that the UE 104 may use to estimate tone reservation locations for each channel null in the downlink channel frequency response. Thus, aspects presented herein may prevent or reduce estimation errors of the location of the tone reservation locations from resulting in a significant internal descrambling error.

At block 1204 of FIG. 12, the method 1200 includes receiving, from the base station via the downlink channel, the downlink transmission. For example, in an aspect, the UE 104, the UE tone reservation component 199, and/or the receiving component 1110 may be configured to or may comprise means for receiving, from the base station via the downlink channel, the downlink transmission.

For example, the receiving at block 1204 may include receiving, from the base station via the downlink channel, the downlink transmission. In some aspects, the downlink transmission may comprise a reduced PAPR signal. The reduced PAPR signal may have been generated by a tone reservation procedure with separated tone reservation null indications.

Further, for example, the receiving at block 1204 may be performed to send the desired signal in the downlink transmission with a reduced PAPR using tone reservation based on dynamically selected subcarriers with a weak channel response. Thus, aspects presented herein provide for a dynamic tone reservation procedure with separate tone reservation null indications that may provide improved performance over conventional tone reservation procedures by dynamically selecting subcarriers with a weak channel response for a tone reservation signal configured to reduce a PAPR of a desired signal. Further, the aspects presented herein may require less signaling overhead and be less sensitive to descrambling errors due to estimation errors by the receiving device when compared to conventional tone reservation procedures.

At block 1206 of FIG. 12, the method 1200 includes estimating, according to the tone reservation report, location information of tone reservations in the downlink transmission. For example, in an aspect, the UE 104, the UE tone reservation component 199, and/or the estimating component 1115 may be configured to or may comprise means for estimating, according to the tone reservation report, location information of tone reservations in the downlink transmission.

For example, the estimating at block 1206 may include determining a downlink channel response of the downlink channel. In some aspects, the UE 104 may receive, from the base station 102 via the downlink channel, a DMRS. In such aspects, the estimating at block 1206 may include performing one or more measurements on the DMRS and determining the downlink channel response of the downlink channel according to the one or more measurements. Alternatively or additionally, the UE 104 may send, to the base station 102, a representation of the downlink channel frequency response in the time domain and/or the frequency domain. Alternatively or additionally, the representation may be compressed (i.e., reduced data size).

In other optional or additional aspects, the estimating at block 1206 may include identifying, according to the count of the channel nulls in the downlink transmission, a plurality of channel nulls matching a selection criteria configured to identify channel subcarriers associated with a lowest energy level or a smallest throughput capacity of the downlink channel response. That is, the UE 104 may identify a set of channel subcarriers having a weak channel response when compared to the remaining channel subcarriers. The selection criteria may be preconfigured and provided to the base station 102 (e.g., transmitting device) and to the UE 104 (e.g., receiving device). Alternatively or additionally, the base station 102 may determine the selection criteria and may provide the selection criteria to the UE 104. For example, the selection criteria may identify subcarriers having a channel power that does not satisfy (e.g., is lower) a predetermined threshold (e.g., −10 dB). Alternatively or additionally, the selection criteria may identify subcarriers having a channel power that does not satisfy a threshold determined according to a minimum channel power indicated by the downlink channel response 410, 610. For example, if or when a minimum channel power indicated by the downlink channel response 410, 610 is −27 dB, the selection criteria may identify subcarriers having a channel power less than 10 dB above the minimum (e.g., −17 dB).

In other optional or additional aspects, the selection criteria used to identify the plurality of channel nulls matches another criteria used by the base station 102 to select nulls in the downlink transmission. That is, the base station 102 and the UE 104 may identify matching sets of channel nulls if or when the downlink channel frequency responses used by the base station 102 and the UE 104 match.

In other optional or additional aspects, the estimating at block 1206 may include identifying the plurality of channel nulls according to a hypothesis of channel energy summations with all possible options that may exist based on the tone reservation quantities of the channel nulls.

In other optional or additional aspects, the estimating at block 1206 may include selecting, according to the plurality of values representing the respective tone reservation quantities of the channel nulls, tone reservation locations for each channel null in the plurality of channel nulls.

Further, for example, the estimating at block 1206 may be performed to estimate the tone reservation locations used by the base station 102 (e.g., transmitting device) to perform the tone reservation on the downlink transmission. Thus, aspects presented herein provide for a dynamic tone reservation procedure with separate tone reservation null indications that may provide improved performance over conventional tone reservation procedures by dynamically selecting subcarriers with a weak channel response for a tone reservation signal configured to reduce a PAPR of a desired signal. Further, the aspects presented herein may require less signaling overhead and be less sensitive to descrambling errors due to estimation errors by the receiving device when compared to conventional tone reservation procedures.

At block 1208 of FIG. 12, the method 1200 includes decoding, according to the location information of the tone reservations, the downlink transmission. For example, in an aspect, the UE 104, the UE tone reservation component 199, and/or the decoding component 1120 may be configured to or may comprise means for decoding, according to the location information of the tone reservations, the downlink transmission.

For example, the decoding at block 1208 may include discarding, from the downlink transmission, data comprised by the channel subcarriers corresponding to the tone reservation locations estimated by the UE 104 at block 1206.

Further, for example, the decoding at block 1208 may be performed to obtain the information comprised by the desired signal that was transmitted by the downlink transmission.

Referring to FIG. 13, in an optional or additional aspect that may be combined with any other aspect, at block 1302, the method 1200 includes receiving, from the base station, a signal indicating to use the tone reservation report for an uplink transmission. For example, in an aspect, the UE 104, the UE tone reservation component 199, and/or the receiving component 1110 may be configured to or may comprise means for receiving, from the base station, a signal indicating to use the tone reservation report for an uplink transmission.

For example, the receiving at block 1302 may include receiving the signal indicating to use the tone reservation report for the uplink transmission via RRC signaling, MAC-CE signaling, and/or DCI signaling. The UE 104 may receive the signal indicating to use the tone reservation report for the uplink transmission in a periodic and/or aperiodic (e.g., on demand) manner.

Further, for example, the receiving at block 1302 may be performed to indicate to the UE 104 to perform an uplink transmission using tone reservation with separated tone reservation null indications. In such an uplink transmission, the base station 102 may be configured as a receiving device and the UE 104 may be configured as a transmitting device.

In this optional or additional aspect, at block 1304, the method 800 includes sending, to the base station and according to the tone reservation report, the uplink transmission. For example, in an aspect, the UE 104, the UE tone reservation component 199, and/or the sending component 1125 may be configured to or may comprise means for sending, to the base station and according to the tone reservation report, the uplink transmission.

For example, the sending at block 1304 may include performing a tone reservation procedure on a desired signal for the uplink transmission. As described in further detail in reference to FIG. 5, the tone reservation procedure may comprise combining a frequency domain version of the desired signal X with a tone reservation signal C at the tone reservation locations 430, 630 that have been determined according to the downlink channel frequency response 410, 610. The combined signal may be converted from the frequency domain to the time domain using an IFFT to produce a reduced PAPR signal that may be amplified and/or sent to the base station 102 (e.g., receiving device). That is, the reduced PAPR signal may have a lower PAPR than the desired signal X Alternatively or additionally, the frequency domain version of the desired signal X and the tone reservation signal C may be separately converted from the frequency domain to the time domain using respective IFFTs. The resulting intermediate time domain signals (i.e., y and c) may be combined (e.g., direct sum, linear sum) to produce the reduced PAPR signal (e.g., y+c).

Further, for example, the sending at block 1304 may be performed to send a desired signal in the uplink transmission with a reduced PAPR using tone reservation based on dynamically selected subcarriers with a weak channel response. Thus, aspects presented herein provide for a dynamic tone reservation procedure with separate tone reservation null indications that may provide improved performance over conventional tone reservation procedures by dynamically selecting subcarriers with a weak channel response for a tone reservation signal configured to reduce a PAPR of a desired signal. Further, the aspects presented herein may require less signaling overhead and be less sensitive to descrambling errors due to estimation errors by the receiving device when compared to conventional tone reservation procedures.

Implementation examples are described in the following numbered clauses

1. A method of wireless communication at a base station of a wireless communication network, comprising:
   - obtaining a downlink channel response of a downlink channel between the base station and a UE of the wireless communication network;
   - determining, according to the downlink channel response, to perform tone reservation with separated tone reservation null indications on a downlink transmission from the base station to the UE;
   - selecting, according to the downlink channel response, a plurality of channel nulls of the downlink transmission;
   - assigning a tone reservation quantity to each channel null of the plurality of channel nulls resulting in a plurality of tone reservation quantities;
   - sending, to the UE via the downlink channel, a tone reservation report comprising:
     - an indication of whether the tone reservation with the separated tone reservation null indications is to be performed on the downlink transmission,
     - a count of channel nulls in the plurality of channel nulls, and
     - a plurality of values representing respective tone reservation quantities; and
   - sending, to the UE via the downlink channel, the downlink transmission according to the plurality of channel nulls and the plurality of tone reservation quantities.

2. The method of clause 1, wherein obtaining the downlink channel response comprises:
   - receiving, from the UE via an uplink channel, a SRS;
   - performing one or more measurements on the SRS to determine an uplink channel response;
   - determining a channel reciprocity between the uplink channel and the downlink channel; and
   - estimating, based on the channel reciprocity and the uplink channel response, the downlink channel response.

3. The method of any previous clause, further comprising:
   - determining supplemental metrics of the downlink channel comprising at least one of a SINR and a delay spread report; and
   - determining, according to the downlink channel response and the supplemental metrics, whether to perform the tone reservation,
   - wherein determining to perform the tone reservation with the separated tone reservation null indications comprises determining, in response to determining to perform the tone reservation, whether to perform the tone reservation with the separated tone reservation null indications on the downlink transmission from the base station to the UE.

4. The method of any previous clause, wherein selecting the plurality of channel nulls comprises:
   - determining a total quantity of tone reservations for the downlink transmission;
   - identifying, based on the downlink channel response, a set of channel subcarriers matching a selection criteria configured to identify channel subcarriers associated with a lowest energy level or a smallest throughput capacity of the downlink channel; and
   - selecting, based on the set of channel subcarriers, the plurality of channel nulls.

5. The method of any previous clause, wherein assigning the tone reservation quantity to each channel null comprises:
   - assigning a portion of the total quantity of the tone reservations to each channel null, wherein a sum of the plurality of tone reservation quantities matches the total quantity of the tone reservations.

6. The method of any previous clause, further comprising:
   - determining that a first channel null from the plurality of channel nulls is similar to a second channel null from the plurality of channel nulls, according to respective energy levels or respective subcarrier indexes of the first channel null and the second channel null; and
   - discarding, in response to determining that the first channel null is similar to the second channel null, the second channel null from the plurality of channel nulls.

7. The method of any previous clause, wherein each value of the plurality of values representing the respective tone reservation quantities comprises a percentage of the total quantity of the tone reservations for the downlink transmission.

8. The method of any previous clause, further comprising:
   - adding or removing a first channel null from the plurality of channel nulls according to a size threshold of the tone reservation report.

9. The method of any previous clause, wherein selecting the plurality of channel nulls comprises:
   - selecting, according to a channel null threshold, the plurality of channel nulls, wherein the count of the channel nulls in the plurality of channel nulls does not exceed the channel null threshold.

10. The method of any previous clause, further comprising:
    - sending, to the UE, a signal indicating to use the tone reservation report for an uplink transmission; and
    - receiving, from the UE according to the tone reservation report, the uplink transmission.

11. An apparatus of wireless communication at a base station of a wireless communication network, comprising:
    - a memory; and a processor communicatively coupled with the memory and configured to:

obtain a downlink channel response of a downlink channel between the base station and a UE of the wireless communication network;

determine, according to the downlink channel response, to perform tone reservation with separated tone reservation null indications on a downlink transmission from the base station to the UE;

select, according to the downlink channel response, a plurality of channel nulls of the downlink transmission;

assign a tone reservation quantity to each channel null of the plurality of channel nulls resulting in a plurality of tone reservation quantities;

send, to the UE via the downlink channel, a tone reservation report comprising:

an indication of whether the tone reservation with the separated tone reservation null indications is to be performed on the downlink transmission, a count of channel nulls in the plurality of channel nulls, and a plurality of values representing respective tone reservation quantities; and send, to the UE via the downlink channel, the downlink transmission according to the plurality of channel nulls and the plurality of tone reservation quantities.

12. The apparatus of clause 11, wherein to obtain the downlink channel response comprises:

receiving, from the UE via an uplink channel, a SRS;

performing one or more measurements on the SRS to determine an uplink channel response;

determining a channel reciprocity between the uplink channel and the downlink channel; and estimating, based on the channel reciprocity and the uplink channel response, the downlink channel response.

13. The apparatus of any previous clause, wherein the processor is further configured to:

determine supplemental metrics of the downlink channel comprising at least one of a SINR and a delay spread report; and determine, according to the downlink channel response and the supplemental metrics, whether to perform the tone reservation, wherein to determine to perform the tone reservation with the separated tone reservation null indications comprises determining, in response to determining to perform the tone reservation, whether to perform the tone reservation with the separated tone reservation null indications on the downlink transmission from the base station to the UE.

14. The apparatus of any previous clause, wherein to select the plurality of channel nulls comprises:

determining a total quantity of tone reservations for the downlink transmission;

identifying, based on the downlink channel response, a set of channel subcarriers matching a selection criteria configured to identify channel subcarriers associated with a lowest energy level or a smallest throughput capacity of the downlink channel; and selecting, based on the set of channel subcarriers, the plurality of channel nulls.

15. The apparatus of any previous clause, wherein to assign the tone reservation quantity to each channel null comprises:

assigning a portion of the total quantity of the tone reservations to each channel null, wherein a sum of the plurality of tone reservation quantities matches the total quantity of the tone reservations.

16. The apparatus of any previous clause, wherein the processor is further configured to:

determine that a first channel null from the plurality of channel nulls is similar to a second channel null from the plurality of channel nulls, according to respective energy levels or respective subcarrier indexes of the first channel null and the second channel null; and discard, in response to determining that the first channel null is similar to the second channel null, the second channel null from the plurality of channel nulls.

17. The apparatus of any previous clause, wherein each value of the plurality of values representing the respective tone reservation quantities comprises a percentage of the total quantity of the tone reservations for the downlink transmission.

18. The apparatus of any previous clause, wherein the processor is further configured to:

add or remove a first channel null from the plurality of channel nulls according to a size threshold of the tone reservation report.

19. The apparatus of any previous clause, wherein to select the plurality of channel nulls comprises:

selecting, according to a channel null threshold, the plurality of channel nulls, wherein the count of the channel nulls in the plurality of channel nulls does not exceed the channel null threshold.

20. The apparatus of any previous clause, wherein the processor is further configured to:

sending, to the UE, a signal indicating to use the tone reservation report for an uplink transmission; and receiving, from the UE according to the tone reservation report, the uplink transmission.

21. A method of wireless communication at a UE of a wireless communication network, comprising:

receiving, from a base station via a downlink channel, a tone reservation report comprising:

an indication of whether tone reservation with separated tone reservation null indications is to be performed on a downlink transmission, a count of channel nulls in the downlink transmission, and a plurality of values representing respective tone reservation quantities of the channel nulls;

receiving, from the base station via the downlink channel, the downlink transmission;

estimating, according to the tone reservation report, location information of tone reservations in the downlink transmission; and decoding, according to the location information of the tone reservations, the downlink transmission.

22. The method of any previous clause, wherein receiving the tone reservation report comprises:

receiving RRC signaling, MAC-CE signaling, or DCI signaling comprising the tone reservation report.

23. The method of any previous clause, wherein estimating the location information of the tone reservations comprises:

determining a downlink channel response of the downlink channel;

identifying, according to the count of the channel nulls in the downlink transmission, a plurality of channel nulls matching a selection criteria configured to identify channel subcarriers associated with a lowest energy level or a smallest throughput capacity of the downlink channel response; and selecting, according to the plurality of values representing the respective tone reservation quantities of the channel nulls, tone reservation locations for each channel null in the plurality of channel nulls.

24. The method of any previous clause, wherein the selection criteria used to identify the plurality of channel nulls matches another criteria used by the base station to select nulls in the downlink transmission.

25. The method of any previous clause, further comprising:

receiving, from the base station, a signal indicating to use the tone reservation report for an uplink transmission; and sending, to the base station and according to the tone reservation report, the uplink transmission.

26. An apparatus of wireless communication at a UE of a wireless communication network, comprising:

a memory; and a processor communicatively coupled with the memory and configured to:

receive, from a base station via a downlink channel, a tone reservation report comprising:

an indication of whether tone reservation with separated tone reservation null indications is to be performed on a downlink transmission, a count of channel nulls in the downlink transmission, and a plurality of values representing respective tone reservation quantities of the channel nulls;

receive, from the base station via the downlink channel, the downlink transmission;

estimate, according to the tone reservation report, location information of tone reservations in the downlink transmission; and decode, according to the location information of the tone reservations, the downlink transmission.

27. The apparatus of any previous clause, wherein to receive the tone reservation report comprises:

receiving RRC signaling, MAC-CE signaling, or DCI signaling comprising the tone reservation report.

28. The apparatus of any previous clause, wherein to estimate the location information of the tone reservations comprises:

determining a downlink channel response of the downlink channel;

identifying, according to the count of the channel nulls in the downlink transmission, a plurality of channel nulls matching a selection criteria configured to identify channel subcarriers associated with a lowest energy level or a smallest throughput capacity of the downlink channel response; and selecting, according to the plurality of values representing the respective tone reservation quantities of the channel nulls, tone reservation locations for each channel null in the plurality of channel nulls.

29. The apparatus of any previous clause, wherein the selection criteria used to identify the plurality of channel nulls matches another criteria used by the base station to select nulls in the downlink transmission.

30. The apparatus of any previous clause, wherein the processor is further configured to:

receive, from the base station, a signal indicating to use the tone reservation report for an uplink transmission; and send, to the base station and according to the tone reservation report, the uplink transmission.

31. An apparatus of wireless communication at a base station of a wireless communication network, comprising means for performing one or more of the methods of any of clauses 1-10.

32. A computer-readable medium storing instructions of wireless communication at a base station of a wireless communication network, executable by a processor, to perform one or more of the methods of any of clauses 1-10.

33. An apparatus of wireless communication at a UE of a wireless communication network, comprising means for performing one or more of the methods of any of clauses 21-25.

35. A computer-readable medium storing instructions of wireless communication at a UE of a wireless communication network, executable by a processor, to perform one or more of the methods of any of clauses 21-25.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station of a wireless communication network, comprising:

obtaining a downlink channel response of a downlink channel between the base station and a user equipment (UE) of the wireless communication network;

determining, according to the downlink channel response, to perform tone reservation with separated tone reservation null indications on a downlink transmission from the base station to the UE;

selecting, according to the downlink channel response, a plurality of channel nulls of the downlink transmission;

assigning a tone reservation quantity to each channel null of the plurality of channel nulls resulting in a plurality of tone reservation quantities;

sending, to the UE via the downlink channel, a tone reservation report comprising:

an indication of whether the tone reservation with the separated tone reservation null indications is to be performed on the downlink transmission, a count of channel nulls in the plurality of channel nulls, and a plurality of values representing respective tone reservation quantities; and sending, to the UE via the downlink channel, the downlink transmission according to the plurality of channel nulls and the plurality of tone reservation quantities.

2. The method of claim 1, wherein obtaining the downlink channel response comprises:

receiving, from the UE via an uplink channel, a sounding reference signal (SRS);

performing one or more measurements on the SRS to determine an uplink channel response;

determining a channel reciprocity between the uplink channel and the downlink channel; and estimating, based on the channel reciprocity and the uplink channel response, the downlink channel response.

3. The method of claim 1, further comprising:

determining supplemental metrics of the downlink channel comprising at least one of a signal-to-interference-plus-noise ratio (SINK) and a delay spread report; and determining, according to the downlink channel response and the supplemental metrics, whether to perform the tone reservation, wherein determining to perform the tone reservation with the separated tone reservation null indications comprises determining, in response to determining to perform the tone reservation, whether to perform the tone reservation with the separated tone reservation null indications on the downlink transmission from the base station to the UE.

4. The method of claim 1, wherein selecting the plurality of channel nulls comprises:

determining a total quantity of tone reservations for the downlink transmission;

identifying, based on the downlink channel response, a set of channel subcarriers matching a selection criteria configured to identify channel subcarriers associated with a lowest energy level or a smallest throughput capacity of the downlink channel; and selecting, based on the set of channel subcarriers, the plurality of channel nulls.

5. The method of claim 4, wherein assigning the tone reservation quantity to each channel null comprises:

assigning a portion of the total quantity of the tone reservations to each channel null, wherein a sum of the plurality of tone reservation quantities matches the total quantity of the tone reservations.

6. The method of claim 4, further comprising:

determining that a first channel null from the plurality of channel nulls is similar to a second channel null from the plurality of channel nulls, according to respective energy levels or respective subcarrier indexes of the first channel null and the second channel null; and discarding, in response to determining that the first channel null is similar to the second channel null, the second channel null from the plurality of channel nulls.

7. The method of claim 4, wherein each value of the plurality of values representing the respective tone reservation quantities comprises a percentage of the total quantity of the tone reservations for the downlink transmission.

8. The method of claim 1, further comprising:

adding or removing a first channel null from the plurality of channel nulls according to a size threshold of the tone reservation report.

9. The method of claim 1, wherein selecting the plurality of channel nulls comprises:

selecting, according to a channel null threshold, the plurality of channel nulls, wherein the count of the channel nulls in the plurality of channel nulls does not exceed the channel null threshold.

10. The method of claim 1, further comprising:

sending, to the UE, a signal indicating to use the tone reservation report for an uplink transmission; and receiving, from the UE according to the tone reservation report, the uplink transmission.

11. An apparatus of wireless communication at a base station of a wireless communication network, comprising:

a memory; and a processor communicatively coupled with the memory and configured to:

obtain a downlink channel response of a downlink channel between the base station and a user equipment (UE) of the wireless communication network;

determine, according to the downlink channel response, to perform tone reservation with separated tone reservation null indications on a downlink transmission from the base station to the UE;

select, according to the downlink channel response, a plurality of channel nulls of the downlink transmission;

assign a tone reservation quantity to each channel null of the plurality of channel nulls resulting in a plurality of tone reservation quantities;

send, to the UE via the downlink channel, a tone reservation report comprising:

an indication of whether the tone reservation with the separated tone reservation null indications is to be performed on the downlink transmission, a count of channel nulls in the plurality of channel nulls, and a plurality of values representing respective tone reservation quantities; and send, to the UE via the downlink channel, the downlink transmission according to the plurality of channel nulls and the plurality of tone reservation quantities.

12. The apparatus of claim 11, wherein to obtain the downlink channel response comprises:

receiving, from the UE via an uplink channel, a sounding reference signal (SRS);

performing one or more measurements on the SRS to determine an uplink channel response;

determining a channel reciprocity between the uplink channel and the downlink channel; and estimating, based on the channel reciprocity and the uplink channel response, the downlink channel response.

13. The apparatus of claim 11, wherein the processor is further configured to:

determine supplemental metrics of the downlink channel comprising at least one of a signal-to-interference-plus-noise ratio (SINR) and a delay spread report; and determine, according to the downlink channel response and the supplemental metrics, whether to perform the tone reservation, wherein to determine to perform the tone reservation with the separated tone reservation null indications comprises determining, in response to determining to perform the tone reservation, whether to perform the tone reservation with the separated tone reservation null indications on the downlink transmission from the base station to the UE.

14. The apparatus of claim 11, wherein to select the plurality of channel nulls comprises:

determining a total quantity of tone reservations for the downlink transmission;

identifying, based on the downlink channel response, a set of channel subcarriers matching a selection criteria configured to identify channel subcarriers associated with a lowest energy level or a smallest throughput capacity of the downlink channel; and selecting, based on the set of channel subcarriers, the plurality of channel nulls.

15. The apparatus of claim 14, wherein to assign the tone reservation quantity to each channel null comprises:

assigning a portion of the total quantity of the tone reservations to each channel null, wherein a sum of the plurality of tone reservation quantities matches the total quantity of the tone reservations.

16. The apparatus of claim 14, wherein the processor is further configured to:

determine that a first channel null from the plurality of channel nulls is similar to a second channel null from the plurality of channel nulls, according to respective energy levels or respective subcarrier indexes of the first channel null and the second channel null; and discard, in response to determining that the first channel null is similar to the second channel null, the second channel null from the plurality of channel nulls.

17. The apparatus of claim 14, wherein each value of the plurality of values representing the respective tone reservation quantities comprises a percentage of the total quantity of the tone reservations for the downlink transmission.

18. The apparatus of claim 11, wherein the processor is further configured to:

add or remove a first channel null from the plurality of channel nulls according to a size threshold of the tone reservation report.

19. The apparatus of claim 11, wherein to select the plurality of channel nulls comprises:

selecting, according to a channel null threshold, the plurality of channel nulls, wherein the count of the channel nulls in the plurality of channel nulls does not exceed the channel null threshold.

20. The apparatus of claim 11, wherein the processor is further configured to:

sending, to the UE, a signal indicating to use the tone reservation report for an uplink transmission; and receiving, from the UE according to the tone reservation report, the uplink transmission.

21. A method of wireless communication at a user equipment (UE) of a wireless communication network, comprising:

receiving, from a base station via a downlink channel, a tone reservation report comprising:

an indication of whether tone reservation with separated tone reservation null indications is to be performed on a downlink transmission, a count of channel nulls in the downlink transmission, and a plurality of values representing respective tone reservation quantities of the channel nulls;

receiving, from the base station via the downlink channel, the downlink transmission;

estimating, according to the tone reservation report, location information of tone reservations in the downlink transmission; and decoding, according to the location information of the tone reservations, the downlink transmission.

22. The method of claim 21, wherein receiving the tone reservation report comprises:

receiving radio resource control (RRC) signaling, medium access control (MAC) control element (MAC-CE) signaling, or downlink control information (DCI) signaling comprising the tone reservation report.

23. The method of claim 21, wherein estimating the location information of the tone reservations comprises:

determining a downlink channel response of the downlink channel;

identifying, according to the count of the channel nulls in the downlink transmission, a plurality of channel nulls matching a selection criteria configured to identify channel subcarriers associated with a lowest energy level or a smallest throughput capacity of the downlink channel response; and selecting, according to the plurality of values representing the respective tone reservation quantities of the channel nulls, tone reservation locations for each channel null in the plurality of channel nulls.

24. The method of claim 23, wherein the selection criteria used to identify the plurality of channel nulls matches another criteria used by the base station to select nulls in the downlink transmission.

25. The method of claim 21, further comprising:

receiving, from the base station, a signal indicating to use the tone reservation report for an uplink transmission; and sending, to the base station and according to the tone reservation report, the uplink transmission.

26. An apparatus of wireless communication at a user equipment (UE) of a wireless communication network, comprising:

a memory; and a processor communicatively coupled with the memory and configured to:

receive, from a base station via a downlink channel, a tone reservation report comprising:

an indication of whether tone reservation with separated tone reservation null indications is to be performed on a downlink transmission, a count of channel nulls in the downlink transmission, and a plurality of values representing respective tone reservation quantities of the channel nulls;

receive, from the base station via the downlink channel, the downlink transmission;

estimate, according to the tone reservation report, location information of tone reservations in the downlink transmission; and decode, according to the location information of the tone reservations, the downlink transmission.

27. The apparatus of claim 26, wherein to receive the tone reservation report comprises:

receiving radio resource control (RRC) signaling, medium access control (MAC) control element (MAC-CE) signaling, or downlink control information (DCI) signaling comprising the tone reservation report.

28. The apparatus of claim 26, wherein to estimate the location information of the tone reservations comprises:

determining a downlink channel response of the downlink channel;

identifying, according to the count of the channel nulls in the downlink transmission, a plurality of channel nulls matching a selection criteria configured to identify channel subcarriers associated with a lowest energy level or a smallest throughput capacity of the downlink channel response; and selecting, according to the plurality of values representing the respective tone reservation quantities of the channel nulls, tone reservation locations for each channel null in the plurality of channel nulls.

29. The apparatus of claim 28, wherein the selection criteria used to identify the plurality of channel nulls matches another criteria used by the base station to select nulls in the downlink transmission.

30. The apparatus of claim 26, wherein the processor is further configured to:

receive, from the base station, a signal indicating to use the tone reservation report for an uplink transmission; and send, to the base station and according to the tone reservation report, the uplink transmission.

* * * * *